United States Patent
Honda et al.

(10) Patent No.: US 11,143,598 B2
(45) Date of Patent: *Oct. 12, 2021

(54) DEFECT INSPECTION APPARATUS AND DEFECT INSPECTION METHOD

(71) Applicant: HITACHI HIGH-TECH CORPORATION, Tokyo (JP)

(72) Inventors: Toshifumi Honda, Tokyo (JP); Shunichi Matsumoto, Tokyo (JP); Masami Makuuchi, Tokyo (JP); Yuta Urano, Tokyo (JP); Keiko Oka, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/070,692

(22) Filed: Oct. 14, 2020

(65) Prior Publication Data

US 2021/0025829 A1 Jan. 28, 2021

Related U.S. Application Data

(63) Continuation of application No. 16/616,069, filed as application No. PCT/JP2018/005536 on Feb. 16, 2018, now Pat. No. 10,830,706.

(30) Foreign Application Priority Data

May 22, 2017 (WO) .................. PCT/JP2017/019046

(51) Int. Cl.
*G01N 21/47* (2006.01)
*G01N 21/88* (2006.01)
*G01N 21/956* (2006.01)

(52) U.S. Cl.
CPC ......... *G01N 21/8806* (2013.01); *G01N 21/47* (2013.01); *G01N 21/956* (2013.01);
(Continued)

(58) Field of Classification Search
CPC ........... G01N 21/8806; G01N 21/9501; G01N 21/8851
(Continued)

(56) References Cited

U.S. PATENT DOCUMENTS 7,903,244 B2    3/2011   Hamamatsu et al.
10,830,706 B2 * 11/2020  Honda ............... G01N 21/8806
(Continued)

FOREIGN PATENT DOCUMENTS

JP    2013-231631 A   11/2013
WO    2017/122320 A1   7/2017

OTHER PUBLICATIONS

International Search Report, PCT/JP2018/005536, dated May 15, 2018, 2 pgs.
(Continued)

*Primary Examiner* — Hung Nguyen
(74) *Attorney, Agent, or Firm* — Volpe Koenig

(57) ABSTRACT

A defect inspection apparatus includes: an illumination unit configured to illuminate an inspection object region of a sample with light emitted from a light source; a detection unit configured to detect scattered light in a plurality of directions, which is generated from the inspection object region; a photoelectric conversion unit configured to convert the scattered light detected by the detection unit into an electrical signal; and a signal processing unit configured to process the electrical signal converted by the photoelectric conversion unit to detect a defect in the sample. The detection unit includes a lens array configured to divide an image to form a plurality of images on the photoelectric conversion unit. The signal processing unit is configured to synthesize electrical signals corresponding to the plurality of formed images to detect a defect in the sample.

18 Claims, 24 Drawing Sheets

(52) U.S. Cl.
CPC ........... *G01N 2021/4792* (2013.01); *G01N 2021/8812* (2013.01); *G01N 2021/8848* (2013.01)

(58) Field of Classification Search
USPC .......................................... 356/237.1–237.5
See application file for complete search history.

(56) References Cited

U.S. PATENT DOCUMENTS

| | | |
|---|---|---|
| 2002/0168787 A1 | 11/2002 | Noguchi et al. |
| 2002/0171825 A1 | 11/2002 | Krantz et al. |
| 2014/0253912 A1* | 9/2014 | Honda ............... G01N 21/956 356/237.5 |
| 2014/0268122 A1* | 9/2014 | Matsumoto ........ G01N 21/9501 356/237.6 |
| 2015/0146200 A1 | 5/2015 | Honda et al. |

OTHER PUBLICATIONS

Chinese Office Action dated Aug. 2, 2021 for Chinese Patent Application No. 201880027159.9.

\* cited by examiner

SEGMENTED
WAVE PLATE

HALF-WAVE PLATE

FIG. 32A
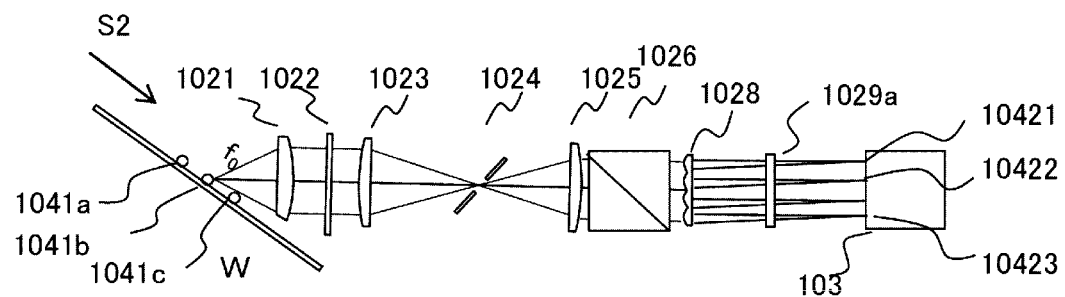
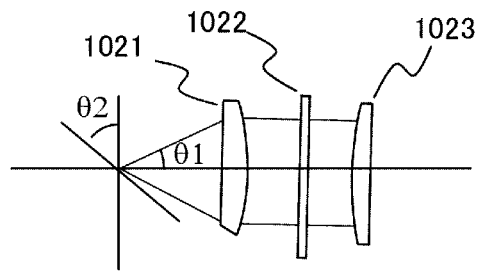
FIG. 32B
FIG. 33
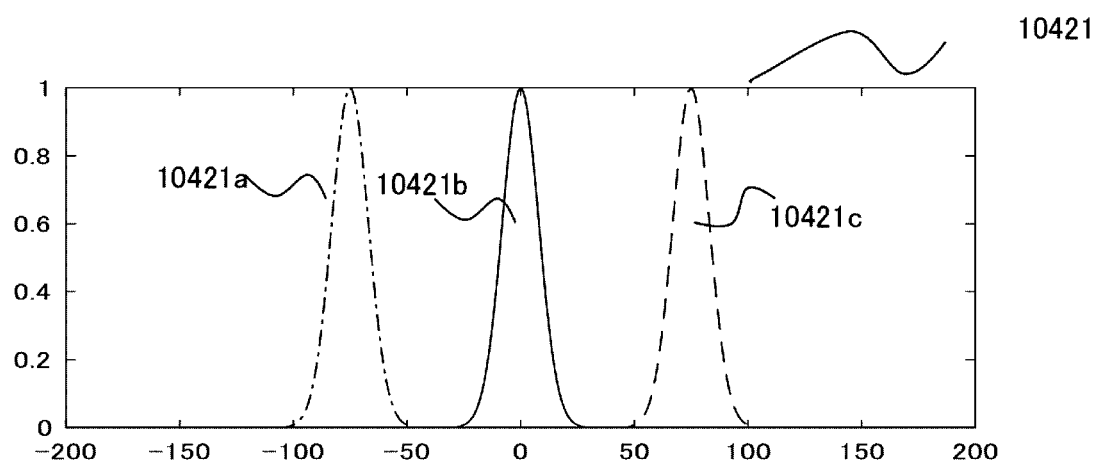

DEFECT INSPECTION APPARATUS AND DEFECT INSPECTION METHOD

CROSS-REFERENCE TO RELATED APPLICATIONS

This non-provisional U.S. patent application is a continuation of U.S. patent application Ser. No. 16/616,069 filed Nov. 22, 2019, which issued as U.S. Pat. No. 10,830,706 on Nov. 10, 2020, which claims the benefit of priority from International Patent Application No. PCT/JP2018/005536 filed Feb. 16, 2018 which claims the benefit of priority from International Patent Application No. PCT/JP2017/019046 filed May 22, 2017, the entire contents of which are hereby incorporated by reference.

TECHNICAL FIELD

The present invention relates to a defect inspection apparatus and a defect inspection method.

BACKGROUND ART

In order to maintain or enhance a yield of a product in a manufacturing line for a semiconductor substrate, a thin film substrate or the like, inspection of a defect that exists on a surface of the semiconductor substrate, the thin film substrate or the like is performed.

For example, Patent Literature 1 describes a technique for inspecting such a defect. In Patent Literature 1, in order to accurately detect a small number of photons from an infinitesimal defect, a large number of pixels are arrayed to form a sensor. Then, total pulse currents generated by incidence of photons on each pixel arrayed in the sensor are measured to detect the infinitesimal defect.

PRIOR ART LITERATURE

Patent Literature

PTL 1: JP-A-2013-231631

SUMMARY OF INVENTION

Technical Problem

For defect inspection used in a manufacturing process of a semiconductor or the like, it is important to detect the infinitesimal defect with high accuracy.

In Patent Literature 1, a detection system including a smaller aperture is arranged such that a longitudinal direction of an image obtained by linear illumination is imaged on a sensor. However, when the detection system is arranged at a position where an optical axis of the detection system is not orthogonal to the longitudinal direction of the linear illumination during image formation in the longitudinal direction of the image, optical distance to a surface of a sample is not constant at a center of a visual field and an edge of the visual field of each detection system. Therefore, it is necessary to dispose the optical axis of the detection system in a direction orthogonal to the longitudinal direction of the linear illumination.

However, it is difficult to completely capture scattered light from the surface of the sample with such an arrangement, and the number of photons is insufficient to detect the infinitesimal defect. As a result, it is difficult to detect an infinitesimal defect that exists on the surface of the sample with high accuracy.

An object of the present invention is to detect a defect that exists on a surface of a sample with high accuracy by a defect inspection apparatus.

Solution to Problem

A defect inspection apparatus according to an aspect of the present invention includes: an illumination unit configured to illuminate an inspection object region of a sample with light emitted from a light source; a detection unit configured to detect scattered light in a plurality of directions, which is generated from the inspection object region; a photoelectric conversion unit configured to convert the scattered light detected by the detection unit into an electrical signal; and a signal processing unit configured to process the electrical signal converted by the photoelectric conversion unit to detect a defect in the sample. The detection unit includes an imaging unit configured to divide an aperture and form a plurality of images on the photoelectric conversion unit. The signal processing unit is configured to synthesize electrical signals corresponding to the plurality of formed images to detect a defect in the sample.

A defect inspection method according to an aspect of the present invention includes: an illumination step of illuminating an inspection object region of a sample with light emitted from a light source; a light detection step of detecting scattered light in a plurality of directions, which is generated from the inspection object region; a photoelectric conversion step of converting the detected scattered light by a photoelectric conversion unit into an electrical signal; and a defect detection step of processing the converted electrical signal to detect a defect of the sample. An aperture of an imaging unit is divided to form a plurality of images on the photoelectric conversion unit in the light detection step. Electrical signals corresponding to the plurality of formed images are synthesized to detect a defect of the sample in the defect detection step.

Advantageous Effect

According to one aspect of the present invention, the defect that exists on the surface of the sample can be detected with high accuracy by the defect inspection apparatus.

BRIEF DESCRIPTION OF DRAWINGS

FIGS. 32A and 32B are diagrams showing an example of a configuration of the detection unit.

FIG. 33 is a graph showing an intensity profile of an image formed by the detection unit.

DESCRIPTION OF EMBODIMENTS

In the following embodiments, a defect inspection apparatus used for defect inspection performed in a manufacturing process of a semiconductor or the like will be described as an example. The defect inspection apparatus is used to achieve the following aspects: detecting of an infinitesimal defect, measuring of dimensions of the detected defect with high accuracy, nondestructive inspecting of a sample (without converting a property of the sample), acquiring of fixed inspection results substantially with regard to the number, positions, dimensions, and defect types of detected defects, inspecting of a large number of samples within fixed time, and the like.

First Embodiment

A configuration of a defect inspection apparatus according to a first embodiment will be described with reference to FIG. 1.

Figure 1:
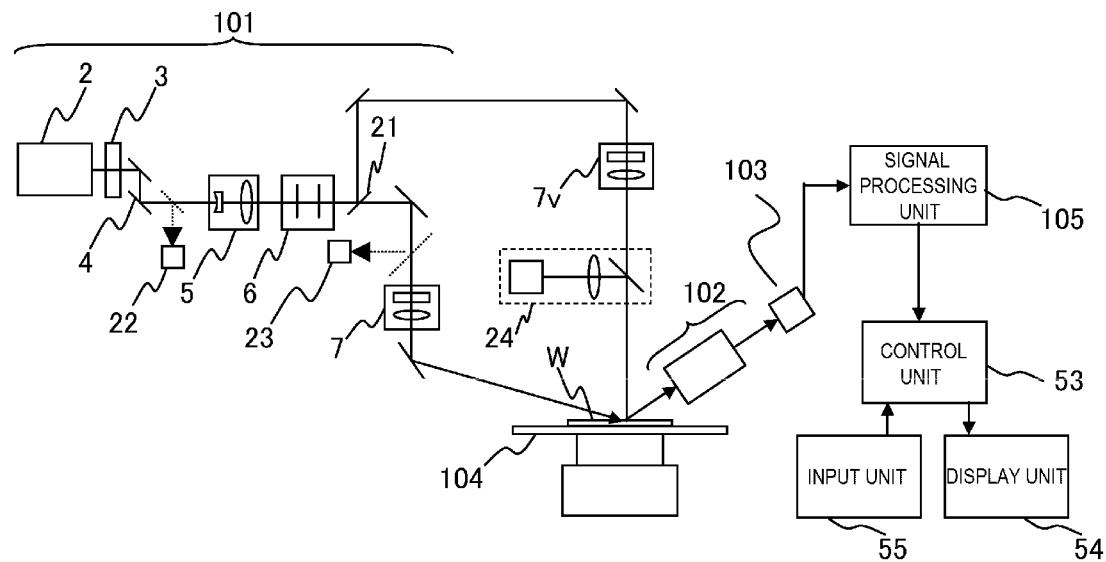
FIG. 1 is an overall schematic configuration diagram showing a defect inspection apparatus according to an embodiment.

As shown in FIG. 1, the defect inspection apparatus includes an illumination unit 101, a detection unit 102, a photoelectric conversion unit 103, a stage 104 on which a sample W can be placed, a signal processing unit 105, a control unit 53, a display unit 54, and an input unit 55. The illumination unit 101 includes, as appropriate, a laser source 2, an attenuator 3, an outgoing beam adjustment unit 4, a beam expander 5, a polarization control unit 6, and an illumination intensity distribution control unit 7.

A laser beam emitted from the laser source 2 is adjusted to have desired beam intensity by the attenuator 3, the laser beam is adjusted to reach a desired beam position and travel in a desired beam travel direction by the outgoing beam adjustment unit 4, the laser beam is adjusted to have a desired beam diameter by the beam expander 5, the laser beam is adjusted to be in a desired polarization state by the polarization control unit 6, the laser beam is adjusted to exhibit desired intensity distribution by the illumination intensity distribution control unit 7, and an inspection object region of the sample W is irradiated with the laser beam.

An incidence angle of illumination light relative to a surface of a sample is determined by a position and an angle of a reflecting mirror of the outgoing beam adjustment unit 4 arranged in an optical path of the illumination unit 101. The incidence angle of the illumination light is set to an angle suitable for detecting an infinitesimal defect. The larger the illumination incidence angle is, that is, the smaller an illumination elevation angle (an angle between the surface of the sample and an illumination optical axis) is, the weaker scattered light (called haze) from minute irregularities on the surface of the sample, which is a noise, is, in relation to scattered light from a minute foreign matter on the surface of the sample, which is suitable for detection of an infinitesimal defect. Therefore, when the scattered light from the minute irregularities of the surface of the sample interferes with the detection of an infinitesimal defect, the incidence angle of the illumination light is preferably set to 75 degrees or more (15 degrees or less in terms of the elevation angle).

Meanwhile, when the shortage of the quantity of scattered light from a defect interferes with the detection of the infinitesimal defect, the incidence angle of the illumination light is preferably set 60 degrees or more and 75 degrees or less (15 degrees or more and 30 degrees or less in terms of the elevation angle) because, in oblique incident illumination, the smaller the incidence angle of the illumination light is, the more an absolute quantity of scattered light from a minute foreign matter is. In oblique incident illumination, the illumination light is polarized to p-polarized light under polarization control of the polarization control unit 6 of the illumination unit 101, and thus scattered light from a defect on the surface of the sample increases compared with other polarized light. In addition, when the scattered light from minute irregularities of the surface of the sample interferes with the detection of an infinitesimal defect, the illumination light is polarized to s-polarized light, and thus scattered light from the minute irregularities of the surface of the sample decreases compared with other polarized light.

If necessary, as shown in FIG. 1, an optical path of illumination light is changed by placing a mirror 21 in an optical path of the illumination unit 101 and arranging other mirrors appropriately, and the illumination light is emitted from a direction substantially perpendicular to the surface of the sample (vertical illumination). At this time, illumination intensity distribution on the surface of the sample is controlled, as in a case of the oblique incident illumination, by an illumination intensity distribution control unit 7v. In order to acquire the oblique incident illumination and scattered light from a concave defect (a flaw by polishing and a crystal defect due to crystal materials) on the surface of the sample by placing a beam splitter in the same position as the mirror 21, the vertical illumination in which illumination light is emitted substantially perpendicularly to the surface of the sample is suitable.

As the laser source 2, one that oscillates an ultraviolet or vacuum ultraviolet laser beam having a short wavelength (355 nm or less) as a wavelength difficult to penetrate an inside of the sample and outputs the laser beam of 2 W or more is used for detecting an infinitesimal defect in a vicinity of the surface of the sample. A diameter of an outgoing beam is about 1 mm. In order to detect a defect inside the sample, a laser source is used which oscillates a visible or infrared laser beam having a wavelength easy to penetrate the inside of the sample.

The attenuator 3 includes, as appropriate, a first polarizing plate, a half-wave plate rotatable around an optical axis of the illumination light, and a second polarizing plate. The light incident on the attenuator 3 is converted to linearly polarized light by the first polarizing plate with a direction of the polarization being rotated to any direction in accordance with an azimuth angle of a slow axis of the half-wave plate, and the light passes through the second polarizing plate. Light intensity is dimmed at any ratio by controlling the azimuth angle of the half-wave plate. When a degree of linear polarization of light incident on the attenuator 3 is sufficiently high, the first polarizing plate is not necessarily required. For the attenuator 3, one in which a relationship between an input signal and a dimming rate is calibrated beforehand is used. As the attenuator 3, it is possible to use an ND filter having gradated density distribution and to use and switch a plurality of ND filters having mutually different density.

The outgoing beam adjustment unit 4 includes a plurality of reflecting mirrors. Here, an embodiment in which the emission light adjustment unit 4 is configured with two reflecting mirrors will be described. However, the invention is not limited thereto, and three or more reflecting mirrors may also be appropriately used. Here, it is assumed that a three-dimensional rectangular coordinate system (XYZ coordinates) is defined, and incident light on the reflecting mirror is traveling in a +X direction. The first reflecting mirror is installed such that the incident light is deflected in a +Y direction (which means the incidence and reflection of light occurs in an XY plane). The second reflecting mirror is installed such that the light reflected by the first reflecting mirror is deflected in a +Z direction (which means the incidence and reflection of light occurs in a YZ plane).

A position and a traveling direction (an angle) of light emitted from the outgoing beam adjustment unit 4 are adjusted by parallel displacement and adjustment of a tilt angle each reflecting mirror. When the incidence and reflection surface (the XY plane) of the first reflecting mirror is orthogonal to the incidence and reflection surface (the YZ plane) of the second reflecting mirror as described above, adjustment of a position and an angle on an XZ plane and adjustment of a position and an angle on the YZ plane of light (traveling in the +Z direction) emitted from the outgoing beam adjustment unit 4 can be independently performed.

The beam expander 5 includes two or more groups of lens, and has a function of magnifying a diameter of an incident parallel light beam. For example, a Galileo beam expander including a combination of a concave lens and a convex lens is used. The beam expander 5 is installed on a translation stage having two or more axes, and the adjustment of the position is possible such that a predetermined beam position and the center are coincident. In addition, the beam expander 5 has a function of adjusting a tilt angle of the entire beam expander 5 such that an optical axis of the beam expander 5 and a predetermined beam optical axis are coincident. The magnification of a diameter of a light beam can be controlled by adjusting an interval between the lenses (a zoom mechanism).

When light incident on the beam expander 5 is not parallel, the magnification of the diameter of the beam and collimation (the semi-parallelization of a light beam) is simultaneously performed by adjusting the interval between the lenses. The collimation of the light beam may be performed by installing a collimator lens on an upstream side of the beam expander 5 independently of the beam expander 5. The magnification of a beam diameter caused by the beam expander 5 is about 5 to 10 times, and a beam emitted from the light source and having a beam diameter of 1 mm is magnified to have a diameter of about 5 mm to 10 mm.

The polarization control unit 6 is configured with a half-wave plate and a quarter-wave plate, and controls a polarization state of illumination light to be any polarization state. On the way of the optical path of the illumination unit 101, a state of light incident on the beam expander 5 and a state of light incident on the illumination intensity distribution control unit 7 are measured by a beam monitor 22.

FIGS. 2 to 6 schematically show a positional relationship between an illumination optical axis 120 guided from the illumination unit 101 to the surface of the sample and an illumination intensity distribution pattern. It should be noted that the configuration of the illumination unit 101 shown in FIGS. 2 to 6 is a part of the configuration of the illumination unit 101, and the outgoing beam adjustment unit 4, the mirror 21, the beam monitor 22, and the like are omitted.

Figure 2:
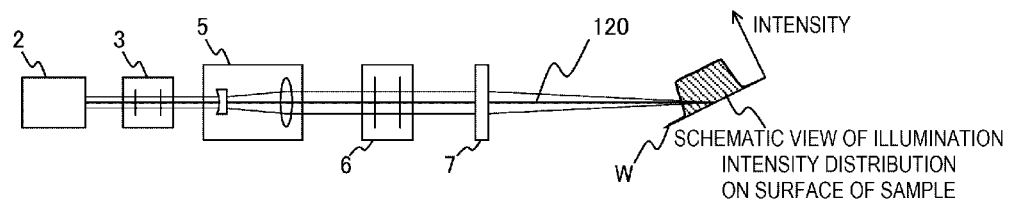
FIG. 2 is a diagram showing a first example of an illumination intensity distribution pattern realized by an illumination unit.

FIG. 2 schematically shows a cross section of an incidence plane (a plane including the optical axis of illumination and the normal of the surface of the sample) of oblique incident illumination. In the oblique incident illumination, the incident light is inclined relative to the surface of the sample within the incidence plane. The illumination unit 101 creates a substantially uniform illumination intensity distribution on the incidence plane. A length of a part where illumination intensity is uniform is about 100 μm to 4 mm so as to inspect a large region per unit time.

Figure 3:
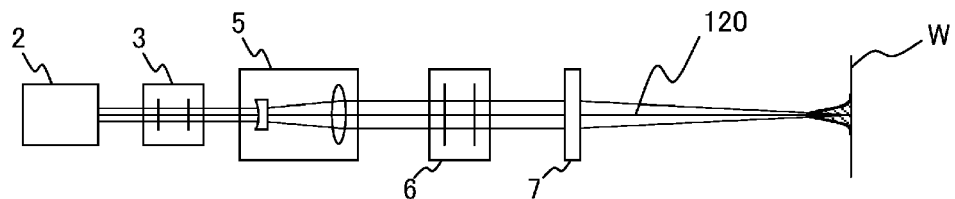
FIG. 3 is a diagram showing a second example of an illumination intensity distribution pattern realized by the illumination unit.
Figure 4:
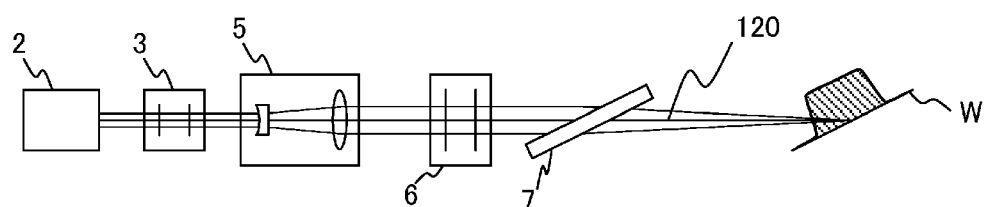
FIG. 4 is a diagram showing a third example of an illumination intensity distribution pattern realized by the illumination unit.
Figure 5:
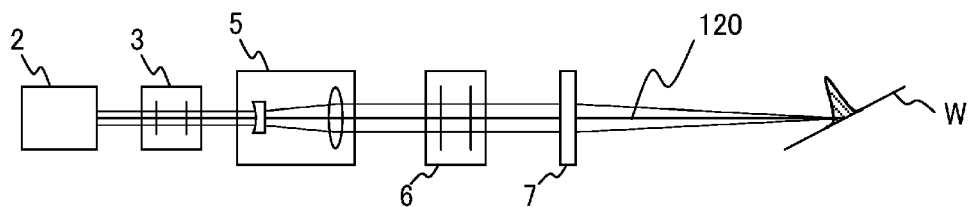
FIG. 5 is a diagram showing a fourth example of an illumination intensity distribution pattern realized by the illumination unit.
Figure 6:
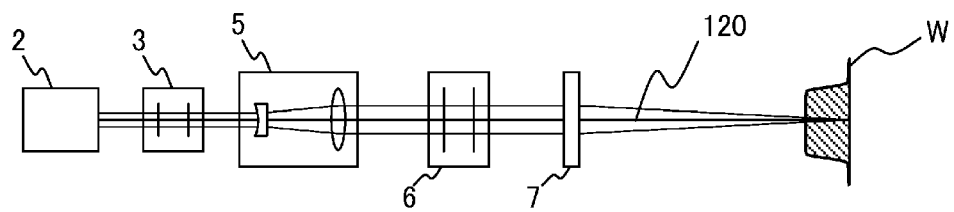
FIG. 6 is a diagram showing a fifth example of an illumination intensity distribution pattern realized by the illumination unit.

FIG. 3 schematically shows a cross section of a plane that includes a normal of the surface of the sample and is perpendicular to an incidence plane in the oblique incident illumination. On this plane, illumination intensity on the surface of the sample is distributed such that the intensity of the periphery is weaker compared with that of the center. More specifically, the illumination intensity distribution is Gaussian distribution that reflects the intensity distribution of the light incident on the illumination intensity distribution control unit 7, or intensity distribution similar to a primary Bessel function of the first kind or a sinc function that reflects a shape of an aperture of the illumination intensity distribution control unit 7. In order to reduce the haze generated from the surface of the sample, the length of illumination intensity distribution (a length of a region having the highest illumination intensity of 13.5% or more) on this plane is shorter than the length of the part where the illumination intensity on the incidence plane is uniform, and is about 2.5 μm to 20 μm. The illumination intensity distribution control unit 7 includes optical elements such as an aspherical lens, a diffractive optical element, a cylindrical lens array, and a light pipe, which will be described below. As shown in FIGS. 2 and 3, the optical elements constituting the illumination intensity distribution control unit 7 are installed perpendicularly to the illumination optical axis.

Figure 7:
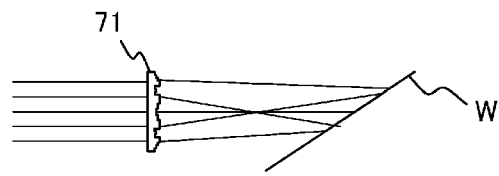
FIG. 7 is a diagram showing a first example of an optical element provided in an illumination intensity distribution control unit.

The illumination intensity distribution control unit 7 includes an optical element that acts on phase distribution and intensity distribution of the incident light. As the optical element constituting the illumination intensity distribution control unit 7, a diffractive optical element 71 (DOE) is used (see FIG. 7).

The diffractive optical element 71 is obtained by forming a minute undulating shape having a dimension equal to or smaller than a wavelength of light on a surface of a substrate formed of materials that transmit incident light. As a material that transmits incident light, fused quartz is used in a case where an ultraviolet light is used for the illumination. In order to inhibit attenuation of light caused by transmission through the diffractive optical element 71, a diffractive optical element to which a reflection reducing coating is applied is preferably used. For the formation of the minute undulating shape, lithography process is used.

Quasi-parallel light obtained by the light passing through the beam expander 5 passes through the diffractive optical element 71, so that illumination intensity distribution on the surface of the sample according to the undulating shape of the diffractive optical element 71 is formed. The undulating shape of the diffractive optical element 71 is designed and produced to a shape determined based on calculation using Fourier optical theory so that the illumination intensity distribution formed on surface of the sample has long uniform distribution on the incidence plane.

The optical element provided in the illumination intensity distribution control unit 7 includes a translation adjustment mechanism having two or more axes and a rotation adjustment mechanism having two or more axes so that a position and an angle relative to the optical axis of the incident light can be adjusted. Further, a focus adjustment mechanism based on a movement in a direction of the optical axis direction is provided. As an alternative optical element having a function similar to the diffractive optical element 71, an aspherical lens, a combination of a cylindrical lens array and a cylindrical lens, or a combination of a light pipe and an imaging lens may be used.

A state of illumination light in the illumination unit 101 is measured by the beam monitor 22. The beam monitor 22 measures and outputs a position and an angle (a traveling direction) of the illumination light that passes the outgoing beam adjustment unit 4, or a position and a wave front of the illumination light incident on the illumination intensity distribution control unit 7. The measurement of the position of the illumination light is performed by measuring a position of a center of gravity of the light intensity of the illumination light. As a specific position measurement unit, a position sensitive detector (PSD) or an image sensor such as a CCD sensor and a CMOS sensor is used.

The measurement of an angle of the illumination light is performed by the position sensitive detector or the image sensor which is installed in a position farther from the light source than the position measurement unit or installed in a converging position of a collimator lens. The position and the angle of the illumination light detected by the sensor are input to the control unit 53 and are displayed on the display unit 54. When the position or the angle of the illumination light is deviated from a predetermined position or angle, the outgoing beam adjustment unit 4 is adjusted such that the illumination light is returned to the predetermined position.

The measurement of the wave front of the illumination light is performed to measure a degree of parallelization of light incident on the illumination intensity control unit 7. Measurement by a shearing interferometer or measurement by a Shack-Hartmann wave front sensor is performed. The shearing interferometer measures a state of diverges or converges of the illumination light by observing a pattern of an interference fringe formed by projecting on a screen both of a reflected light from a front surface of an optical glass and a reflected light from a back surface of the optical glass. In the shearing interferometer, the optical glass is placed by obliquely tilting in the optical path of illumination light and has a thickness of approximately several mm with both surfaces polished flatly. An example of the shearing interferometer includes SPUV-25 manufactured by SIGMA KOKI, or the like. When an image sensor such as a CCD sensor and a CMOS sensor is installed in the position of the screen, the state in which illumination light diverges or converges can be automatically measured.

The Shack-Hartmann wave front sensor divides a wave front by the minute lens array and projects the divided wave front to an image sensor such as a CCD sensor, and measures inclination of an individual wave front based on a displacement of a projection position. Compared with the shearing interferometer, detailed wave front measurement such as partial disturbance of a wave front can be performed by using the Shack-Hartmann wave front sensor. When it is ascertained by the wave-front measurement that the light incident on the illumination intensity control unit 7 is not a quasi-parallel light but a diverged light or a converged light, the incident light can be arranged to approach the quasi-parallel light by displacing the lens groups of the beam expander 5 on the upstream side, in the direction of the optical axis.

When it is ascertained by the wave-front measurement that the wave front of the light incident on the illumination intensity control unit 7 is partially tilted, the wave front can be adjusted to be approximately flat by placing a spatial light phase modulation element, which is one type of spatial light modulator (SLM), on the upstream side of the illumination intensity control unit 7 and applying appropriate phase difference to each position on a cross section of a light beam such that the wave front is flat. That is, illumination light can be made to approximate the quasi-parallel light. The wave front accuracy (displacement from a predetermined wave front (a designed value or an initial state)) of the light incident on the illumination intensity distribution control unit 7 is reduced to $\lambda/10$ rms or less by the above-described wave front accuracy measurement/adjustment units.

The illumination intensity distribution on the surface of the sample, which is adjusted by the illumination intensity distribution control unit 7, is measured by an illumination intensity distribution monitor 24. As shown in FIG. 1, when vertical illumination is used, the illumination intensity distribution on the surface of the sample, which is adjusted by the illumination intensity distribution control unit 7v, is also measured by the illumination intensity distribution monitor 24 similarly. The illumination intensity distribution monitor 24 images the surface of the sample on an image sensor such as a CCD sensor and a CMOS sensor via a lens and detects the illumination intensity distribution on the surface of the sample as an image.

The image of the illumination intensity distribution detected by the illumination intensity distribution monitor 24 is processed by the control unit 53, a position of the center of gravity of intensity, maximum intensity, a maximum intensity position, the width and the length of illumination intensity distribution (the width and the length of an illumination intensity distribution region having a predetermined ratio equal to or higher than a predetermined intensity or equal to or higher than maximum intensity value), and the like are calculated, and are displayed together with a contour of the illumination intensity distribution and a sectional waveform thereof on the display unit 54.

In the case of oblique incident illumination, the disturbance of illumination intensity distribution due to the displacement of a position of the illumination intensity distribution and defocusing is caused by the displacement in height of the surface of the sample. In order to prevent the problem, the height of the surface of the sample is measured, and when the height is deviated, the deviation is corrected by the illumination intensity distribution control unit 7 or by the adjustment of height in a Z axis of the stage 104.

The illumination distribution pattern (a light spot 20) formed on the surface of the sample by the illumination unit 101 and a sample scanning method will be described with reference to FIGS. 8 and 9, respectively.

As the sample W, a circular semiconductor silicon wafer is assumed. The stage 104 includes a translation stage, a rotation stage, and a Z stage for adjusting the height of the surface of the sample (all not shown). The light spot 20 has illumination intensity distribution longitudinal in one direction as described above. The longitudinal direction is defined as S2, and a direction substantially orthogonal to S2 is defined as S1. The sample is scanned in a circumferential direction S1 of a circle having a rotation axis of the rotating stage as the center, by rotational movement of the rotation stage, and is scanned in a translation direction S2 of a translation stage by translation movement of the translation stage. The light spot draws a spiral locus T on the sample W by scanning, in the scanning direction S2, by distance equal to or shorter than the length of the light spot 20 in a longitudinal direction while the sample is rotated once by scanning in the scanning direction S1, and an entire surface of the sample 1 is scanned.

A plurality of detection units 102 are arranged to detect scattered light in a plurality of directions generated from the light spot 20. Examples of the arrangement of the detection units 102 relative to the sample W and the light spot 20 will be described with reference to FIGS. 10 to 12.

Figure 10:
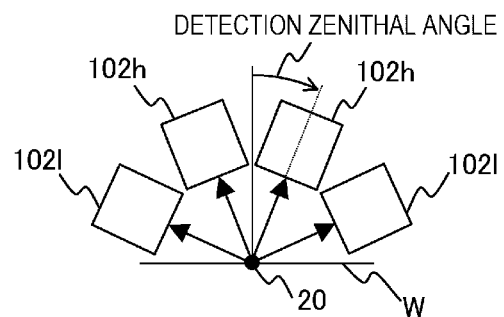
FIG. 10 is a view of arrangement of a detection unit and detection directions as viewed from the side.

FIG. 10 shows the arrangement of the detection units 102. An angle formed between a normal of the sample W and a detection direction based on the detection unit 102 (a center direction of an aperture for detection) is defined as a detection zenithal angle. The detection unit 102 includes, as appropriate, a high-angle detection unit 102*h* having a detection zenithal angle of 45 degrees or less and a low-angle detection unit 102*l* having a detection zenithal angle of 45 degrees or more. A plurality of high-angle detection units 102*h* and a plurality of low-angle detection units 102*l* are provided so as to cover scattered light scattered in many directions at each detection zenithal angle.

Figure 11:
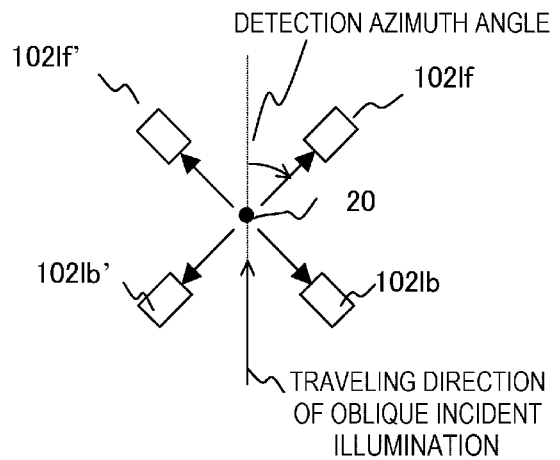
FIG. 11 is a view of arrangement of a low-angle detection unit and detection directions as viewed from above.

FIG. 11 is a plan view showing an arrangement of the low-angle detection unit 102*l*. An angle between the traveling direction of oblique incident illumination and the detection direction on a plane parallel to the surface of the sample W is defined as a detection azimuth angle. The low-angle detection unit 102 includes, as appropriate, a low-angle front detection unit 102*lf*, a low-angle lateral side detection unit 102*ls*, and a low-angle back detection unit 102*lb*, as well as a low-angle front detection unit 102*lf'*, a low-angle lateral side detection unit 102*ls'*, and a low-angle back detection unit 102*lb'* which are respectively located in positions symmetric to former detection units in relation to an illumination incidence plane. For example, the low-angle front detection unit 102*lf* is installed such that a detection azimuth angle thereof is 0 degree or more and 60 degrees or less. The low-angle lateral side detection unit 102*ls* is installed such that a detection azimuth angle thereof is 60 degrees or more and 120 degrees or less. The low-angle back detection unit 102*lb* is installed such that a detection azimuth angle thereof is 120 degrees or more and 180 degrees or less.

Figure 12:
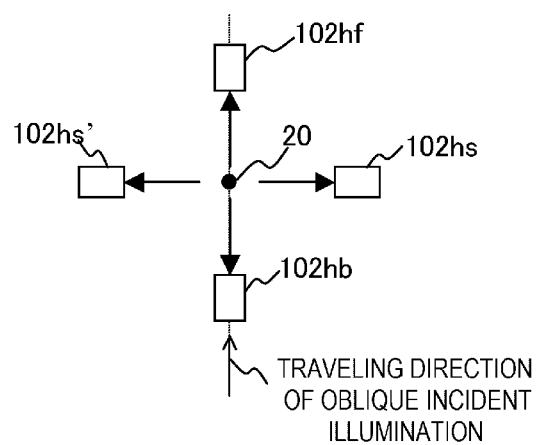
FIG. 12 is a view of arrangement of a high-angle detection unit and detection directions as viewed from above.

FIG. 12 is a plan view showing an arrangement of the high-angle detection unit 102*h*. The high-angle detection unit 102 includes, as appropriate, a high-angle front detection unit 102*hf*, a high-angle lateral side detection unit 102*hs*, a high-angle back detection unit 102*hb*, and a high-angle lateral side detection unit 102*hs'* located in a position symmetric to the high-angle lateral side detection unit 102*hs* in relation to the illumination incidence plane. For example, the high-angle front detection unit 102*hf* is installed such that a detection azimuth angle thereof is 0 degree or more and 45 degrees or less. The high-angle back detection unit 102*hb* is installed such that a detection azimuth angle thereof is 135 degrees or more and 180 degrees or less. Here, the case where four high-angle detection units 102*h* are provided and six low-angle detection units 102*l* are provided is described above, but the invention is not limited thereto. The number and positions of the detection units may be changed as appropriate.

A specific configuration of the detection unit 102 will be described with reference to FIGS. 13A and 13B.

Figure 13A:
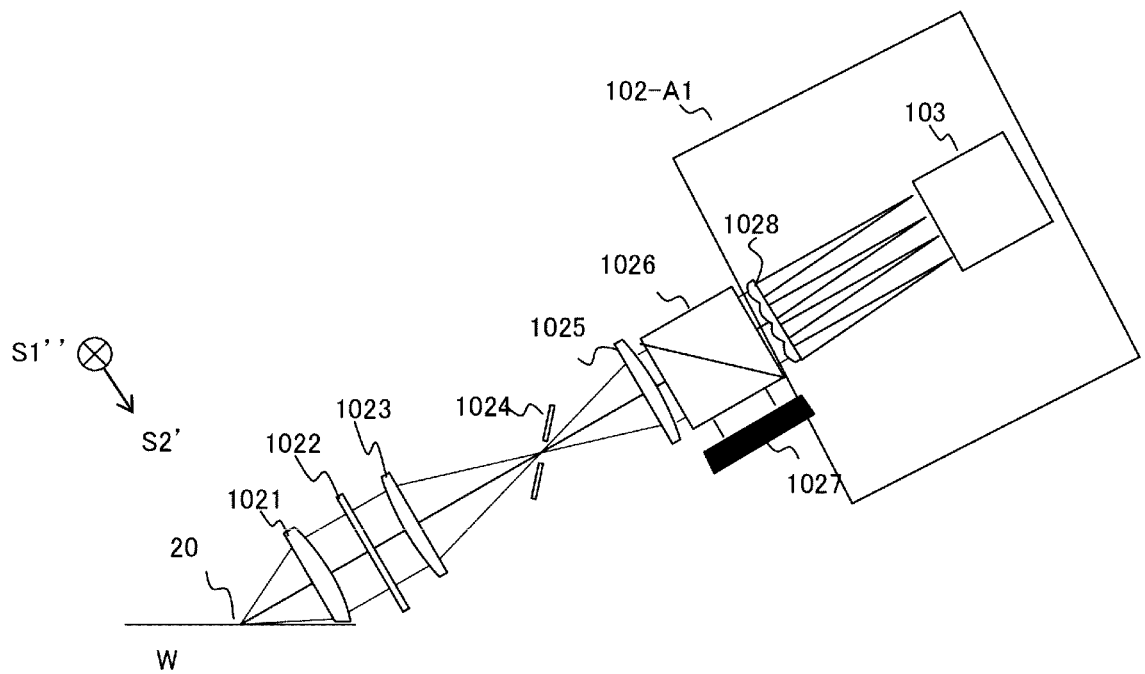
FIGS. 13A and 13B are diagrams showing a first example of a configuration of the detection unit.
Figure 13B:
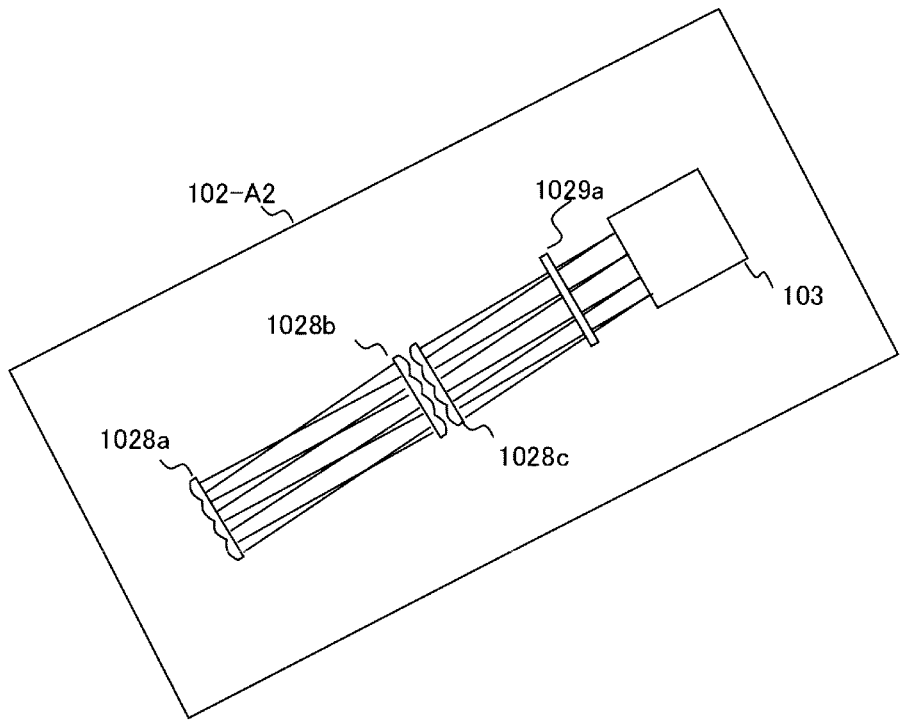

As shown in FIGS. 13A and 13B, scattered light generated from the light spot 20 is converged by an objective lens 1021, and a polarization direction of the scattered light is controlled by a polarization control filter 1022. As the polarization control filter 1022, a half-wave plate whose rotation angle can be controlled by a drive mechanism such as a motor is used. In order to efficiently detect the scattered light, a numerical aperture (NA) for detection of the objective lens 1021 is preferably 0.3 or more. In the case of the low-angle detection unit, a lower end of the objective lens is cut off if necessary so that the interference of the lower end of the objective lens 1021 with the surface of the sample W is avoided. An imaging lens 1023 images the light spot 20 in a position of an aperture 1024.

The aperture 1024 is an aperture that is set to allow passing of only the light in a region to be converted by the photoelectric conversion unit 103 among formed images of the beam spot 20. When the light spot 20 has a Gaussian distribution profile in the S2 direction, the aperture 1024 allows only a central portion having a large quantity of light in the S2 direction in the Gaussian distribution to pass through, and shields a region in the Gaussian distribution where the quantity of light in a beam end is small.

A disturbance such as air scattering is prevented which occurs when the illumination with the same size as the formed image of the light spot 20 in the direction S1 transmits through air. A condenser lens 1025 converges the formed image of the aperture 1024 again. A polarization beam splitter 1026 separates, according to polarization directions, the light whose polarization direction is converted by the polarization control filter 1022. A diffuser 1027 absorbs light in a polarization direction which is not used for photoelectric conversion in the photoelectric conversion unit 103. A lens array 1028 forms images of the beam spot 20 on the photoelectric conversion unit 103 corresponding to the number of arrays.

In the embodiment, only light in a specific polarization direction among the light converged by the objective lens 1021 is photoelectrically converted by the photoelectric conversion unit 103 via a combination of the polarization control filter 1022 and the polarization beam splitter 1026. As an alternative example, for example, the polarization control filter 1022 may be a wire grid polarizer having a transmittance of 80% or higher, so that light in a desired polarization direction can be obtained without using the polarization beam splitter 1026 and the diffuser 1027.

Figure 14A:
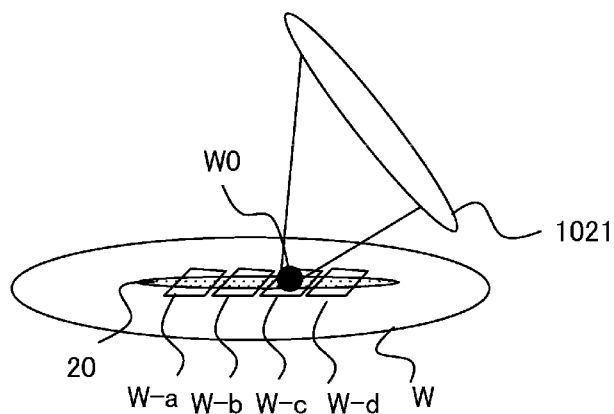
FIGS. 14A and 14B are diagrams showing a first example of a configuration of an imaging optical system to a photoelectric conversion unit.
Figure 14B:
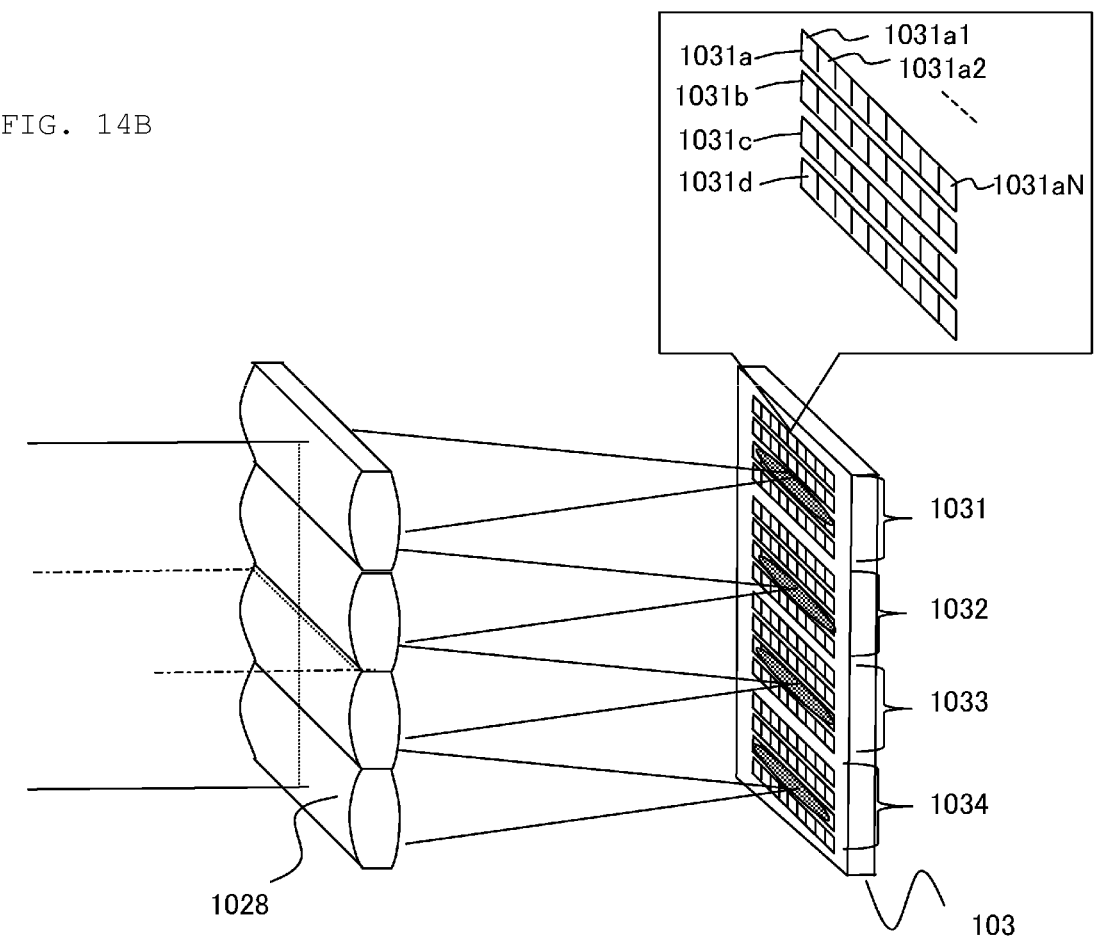

FIG. 14A includes a schematic diagram of the light spot 20 on the sample W and FIG. 14B is a correspondence with the imaging from the lens array 1028 to the photoelectric conversion unit 103.

Figure 8:
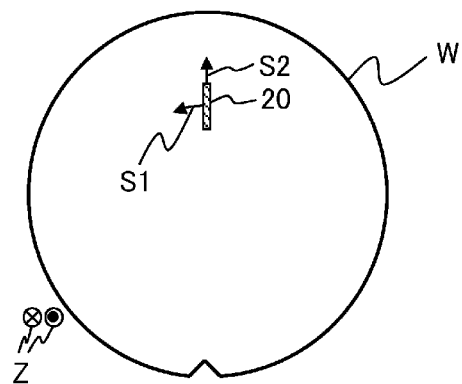
FIG. 8 is a diagram showing a first example that shows an illumination distribution pattern and a scanning direction on a surface of a sample.
Figure 9:
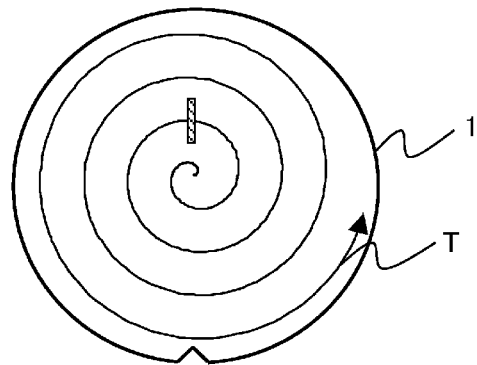
FIG. 9 is a diagram showing a first example of a locus of a light spot formed by scanning.

As shown in FIG. 14A, the light spot 20 extends long in the direction S2 of FIG. 8. W0 indicates a defect to be detected. The photoelectric conversion unit 103 divides the light spot into W-a to W-d and detects the divided light spots. Here, the light spot is divided into four parts, but the present invention is not limited to this number. The present invention may be embodied by setting the number of divisions to any integer.

As shown in FIG. 14B, scattered light from W0 is converged by the objective lens 1021 and guided to the photoelectric conversion unit 103. The lens array 1028 is configured with cylindrical lenses that image only in one direction. In the photoelectric conversion unit 103, pixel blocks 1031, 1032, 1033, and 1034 corresponding to the number of arrays of the lens array 1028 are arranged. Since the region where the quantity of light is small and the photoelectric conversion is not performed is shielded by the aperture 1024, the pixel blocks 1031 to 1034 can be arranged close to each other. The lens array 1028 is placed at a position where a pupil of the objective lens 1021 is relayed. In order to form an image for each of divided pupil regions, the image formed by the lens array 1028 is narrowed by narrowing the aperture, and depth of a focus is increased. As a result, imaging detection is possible from a direction that is not orthogonal to S2.

Here, an effect of the lens array 1028 will be described in more detail with reference to FIG. 31. The condenser lens 1025 has a large numerical aperture that is generally equal to the numerical aperture of the objective lens 1021. The condenser lens 1025 having a large numerical aperture converges light scattered in various directions, which reduces the depth of the focus. When an optical axis of the objective lens 1021 is not orthogonal to S2 that is a longitudinal direction of the illumination, optical distance varies at a center of a visual field and an edge of the visual field, and an image formed on the photoelectric conversion unit 103 is defocused.

Figure 31:
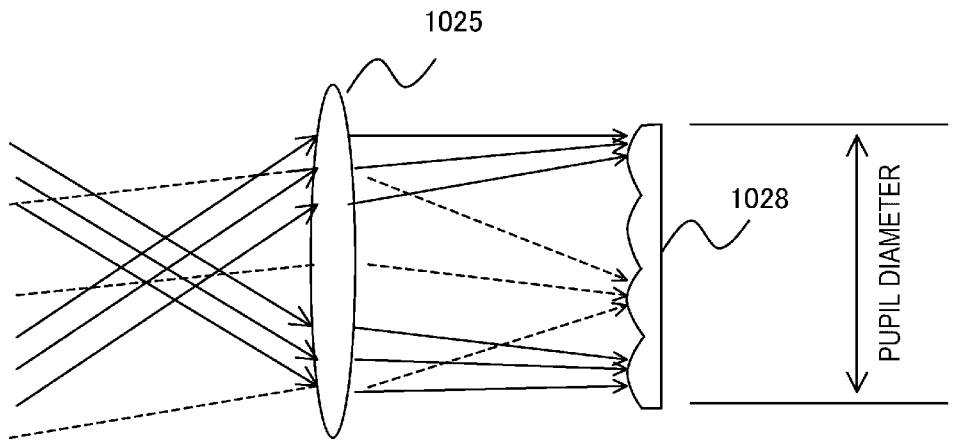
FIG. 31 is a diagram showing an embodiment of an arrangement of the lens array.

As shown in FIG. 31, the lens array 1028 is placed at a pupil position of the condenser lens 1025. In other words, the lens array 1028 is placed at a position where a pupil of the objective lens 1021 is relayed. Further, in other words, the lens array 1028 is located at a rear focal position of the condenser lens 1025. The condenser lens 1025 has a size equal to a pupil diameter so that all light incident on the aperture diameter of the objective lens 1021 can be imaged ideally.

At the position of the lens array 1028, light having an incident direction similar to an incident direction towards the condenser lens 1025 is distributed to be close to each other. As a result, when the lens array 1028 is placed at this position, the numerical aperture is reduced, and the depth of the focus may be increased. In this way, the pupil region is divided so as to reduce the numerical aperture, an image corresponding to each of the divided pupil regions is formed on a photoelectric conversion surface of the photoelectric conversion unit 103 to form an image without a defocus, so that an infinitesimal defect is detected.

As shown in FIG. 14B, photoelectric elements are two-dimensionally formed in each of the pixel blocks 1031 to 1034. First, pixel blocks of the pixel block 1031 will be described. 1031$a$ to 1031$d$ denote pixel groups formed in the pixel block 1031, and cause light from sections W1 to W4 at the position of the light spot to be imaged, respectively. 1031$a$1 to 1031$a$N are pixels belonging to the pixel group 1031$a$, and each pixel outputs a predetermined current when photons are incident. The outputs of pixels belonging to the same pixel group are electrically connected, and one pixel group outputs a sum of current outputs of the pixels belonging to the pixel group. Similarly, the pixel blocks 1032 to 1034 also output a sum of currents corresponding to W-a to W-d. The outputs from the respective pixel group, each of which corresponds to the same section, are electrically connected, and the photoelectric conversion unit 103 outputs an electrical signal corresponding to the number of photons detected from a section of each of W1 to W4.

The detection system in FIGS. 13A and 13B are arranged such that a long-axis direction of an image of the light spot 20 in the photoelectric conversion unit 103 coincides with the direction S2'. As shown in FIG. 8, when S1 and S2 are defined, a vector of the light spot in a length direction is shown represented by (Formula 1).

$$S1=[1,0,0]'\qquad\text{(Formula 1)}$$

Figure 15:
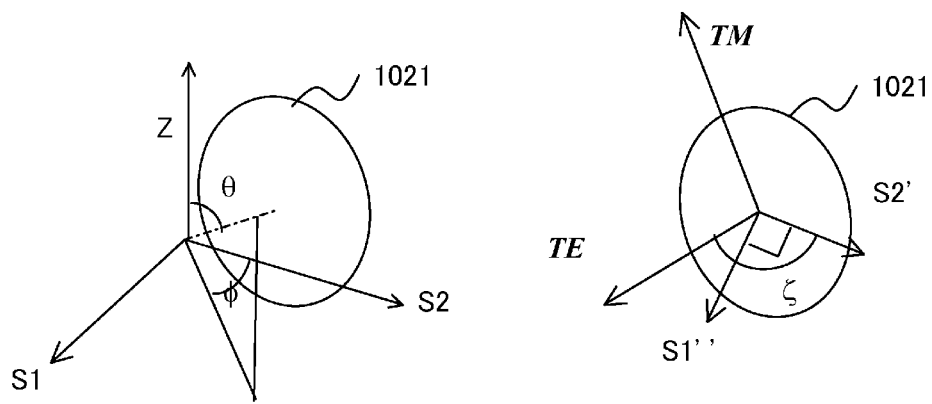
FIG. 15 is a diagram showing a coordinate system of the detection unit.

Next, when an angle of an optical axis passing through a center of the objective lens 1021 relative to a vertical direction Z of the sample W is defined as θ and an angle of the optical axis relative to S2 is defined as φ, a vector representing the optical axis is represented by (Formula 2) (see FIG. 15).

$$D=[\sin θ \cos φ, \sin θ \sin φ, \cos θ]' \quad \text{(Formula 2)}$$

When the light spot 20 is captured from the objective lens 1021, the same component as the optical axis in S1 is lost. Accordingly, the vector is represented by (Formula 3).

$$S1'=S1-(S1'·D)D)/\|S1-(S1'-D)D\| \quad \text{(Formula 3)}$$

A two-dimensional plane excluding the optical axis of the objective lens 1021 is divided into two vectors: one having a Z-direction component and the other one having no Z-direction component (which is shown in (Formula 4) and (Formula 5)).

$$TM=[-\cos θ \cos φ, -\cos θ \sin φ, \sin θ]' \quad \text{(Formula 4)}$$

$$TE=[-\sin θ \sin φ, \sin θ \cos φ, 0]' \quad \text{(Formula 5)}$$

At this time, S2' in FIGS. 13A and 13B are set in a direction obtained by being rotated from a vector having no Z-direction component represented by (Formula 5) by an angle represented by (Formula 6).

$$ξ=a \tan 2(S1'·TM, S1'·TE) \quad \text{(Formula 6)}$$

S1" is set so as to be orthogonal to S2'. In this way, the lens array 1028 and the photoelectric conversion unit 103 are arranged. A length of a visual field detected here is defined as L, and a difference Δd between optical distance of the center of the visual field and the edge of the visual field is represented by (Formula 7) below.

$$Δd=L/2 \sin θ \cos φ \quad \text{(Formula 7)}$$

Here, when the numerical aperture of the objective lens 1021 is defined as NA and NA is divided by M via the lens array 1028, a depth of a focus DOF of an image of each lens array is represented as follows.

$$DOF = \frac{λ}{2(NA/M)^2} \quad \text{(Formula 8)}$$

At this time, the interval that can be resolved in the direction S2 is represented by the following (Formula 9) based on the size of Airy disk.

$$Δx_{s2} = \frac{0.61Mλ}{NA(1-(\sin θ \cos φ)^2)^{0.5}} \quad \text{(Formula 9)}$$

When M is increased, the resolution represented by (Formula 9) is deteriorated, and thus the detection sensitivity of a defect decreases. However, when the depth of the focus represented by (Formula 8) is insufficient for the difference of optical distance in (Formula 7), the resolution at the edge of the visual field is deteriorated due to insufficient depth of the focus, and thus the detection sensitivity of the defect decreases. Therefore, M is typically set to satisfy the following condition of (Formula 10).

$$M ≈ NA \bigg/ \left(\frac{\sin θ \cos φ λ}{L}\right)^{0.5} \quad \text{(Formula 10)}$$

Next, an internal circuit of the photoelectric conversion unit 103 will be described with reference to FIG. 16. The photoelectric conversion unit 103 that performs output corresponding to the four sections W1 to W4 is described in FIGS. 14A and 14B, but an example in which the four sections are increased to eight sections will be described with reference to FIG. 16.

Eight pixel groups are formed in each of the pixel blocks 1031 to 1034. For example, pixels 1031a to 1031h are formed in the pixel block 1031, and groups of the pixel blocks 1032 to 1034 are similarly formed. 1031a5 is a fifth pixel of 1031a, and an avalanche photodiode operating in Geiger mode is connected to a signal line 1035-1a via a quenching resistor 1031a5q.

Similarly, all the pixels belonging to the pixel group 1031a are connected to 1035-1a, and a current flows through 1035-1a when photons are incident on the pixels. 1035-2a is a signal line to which pixels of a pixel group 1032a are connected. In this way, all the pixel groups are provided with signal lines to which pixels belonging to the pixel group are electrically connected. In order to detect scattered light from the same position in the sample W by 1031a to 1034a respectively, signal lines of 1031a to 1034a are connected to 1035-a via 1036-1a to 1036-4a, respectively. This signal is connected by a pad 1036-a, and is transmitted to the signal processing unit 105. Similarly, the pixels belonging to 1031b to 1034b are connected to the signal line 1035-b. The signals are connected by a pad 1036-b, and are transmitted to the signal processing unit 105.

Figure 16:
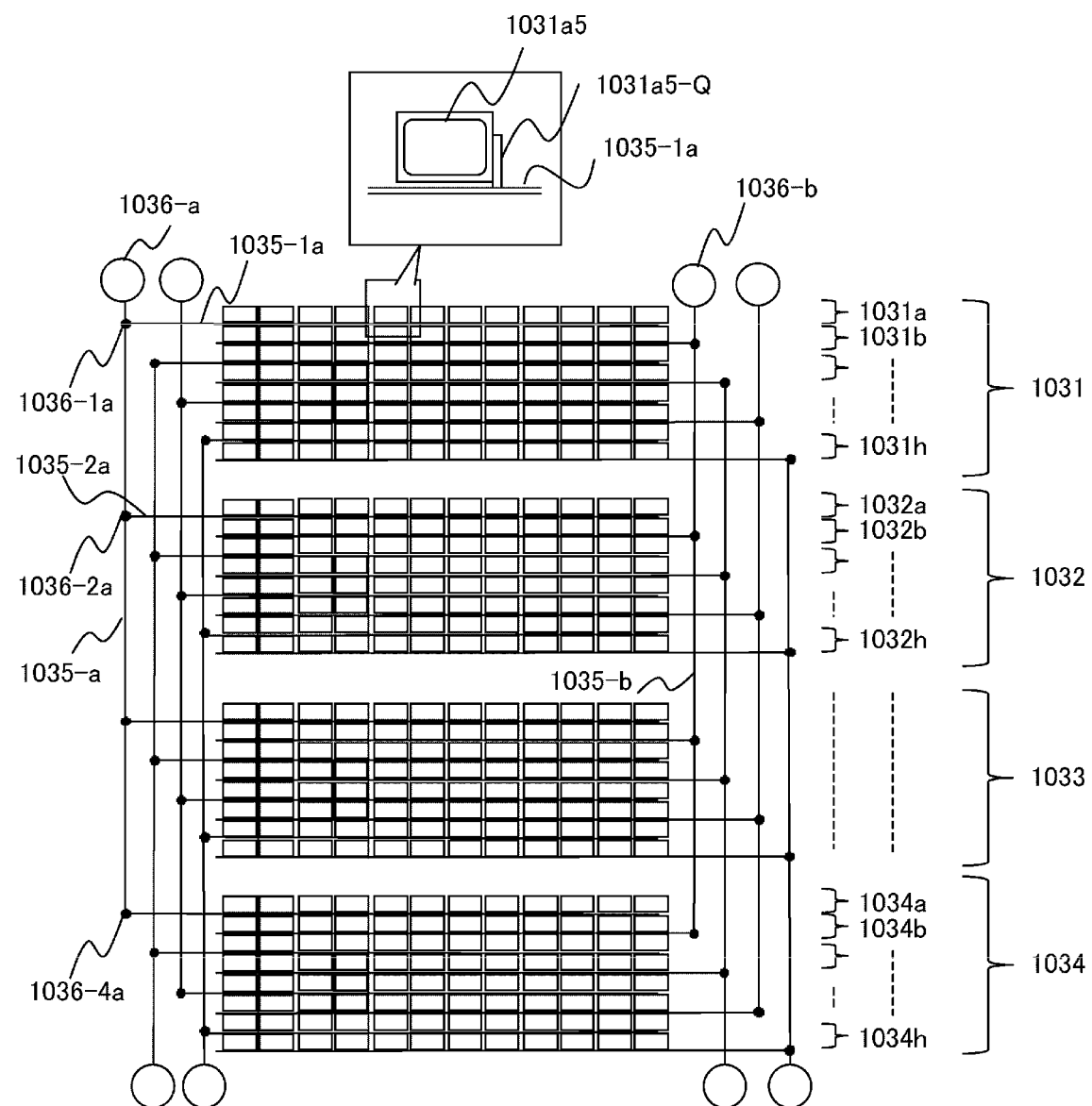
FIG. 16 is a diagram showing a first example of the photoelectric conversion unit.
Figure 17:
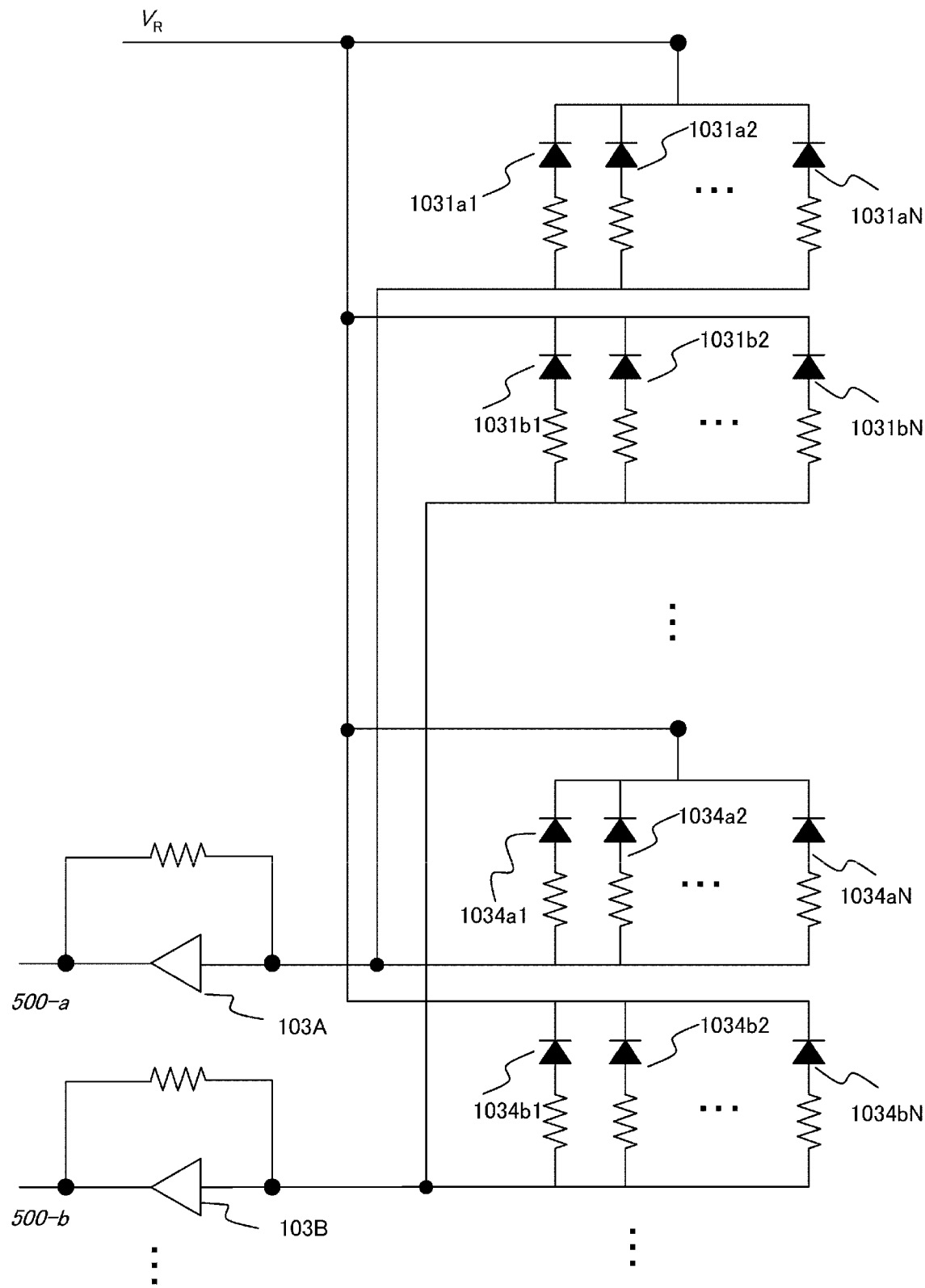
FIG. 17 is a diagram showing a first example of an equivalent circuit of components of the photoelectric conversion unit.

Here, an equivalent circuit of that of FIG. 16 is shown in FIG. 17.

As shown in FIG. 17, the N pixels belonging to the pixel group 1031a in the pixel block 1031, i.e., 1031a1 to 1031aN denote an avalanche photodiode and a quenching resistor connected thereto. The reverse voltage VR is applied to all the avalanche photodiodes formed in the photoelectric conversion unit 103 such that all the avalanche photodiodes operate in Geiger mode. When photons are incident, a current flows through the avalanche photodiode. However, a reverse bias voltage is lowered due to quenching resistors as a pair, and is electrically disconnected again. In this way, a constant current flows for every incidence of photons.

Similarly, N pixels belonging to the pixel group 1034a in the pixel block 1034, i.e., 1034a1 to 1034aN also denote an avalanche photodiode in Geiger mode and a quenching resistor coupled thereto similarly. All the pixels belonging to the pixel groups 1031a and 1034a correspond to the reflection or scattered light from the region W-a in the sample W. All the signals are electrically coupled, and are connected to a current-voltage conversion unit 103a. The current-voltage conversion unit 103a outputs a signal 500-a converted into a voltage.

Similarly, the pixels belonging to the pixel group 1031b of the pixel block 1031, i.e., 1031b1 to 1031bN, and the pixels 1034b1 to 1034bN belonging to the pixel group 1034b of the pixel block 1034 correspond to light from a surface of a sample W-b, and all the outputs are electrically coupled so as to be connected to a current-voltage conversion unit 103b. The current-voltage conversion unit 103b outputs a voltage signal 500-b. In this way, signals corresponding to all the regions obtained by dividing the light spot 20 are output.

Figure 18:
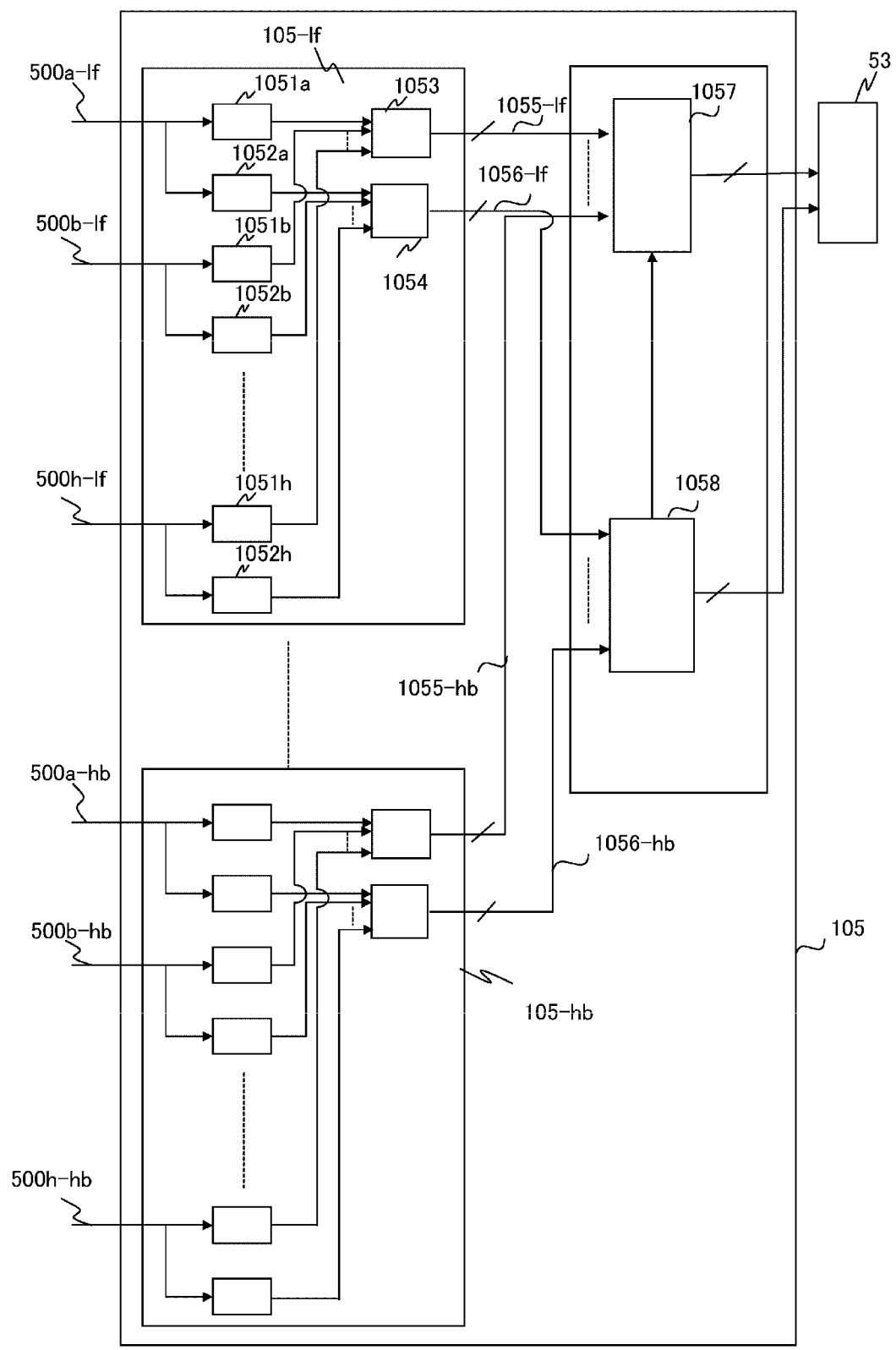
FIG. 18 is a block diagram showing an example of a data processing unit.

FIG. 18 shows a data processing unit 105 when the light spot 20 is divided into W-a to W-h.

105-1f denotes a block that processes signals 500a-1f to 500h-1f obtained by photoelectric conversion of light detected by a low-angle front detection unit 102-1f. 105-hb denotes a block that processes signals 500a-hb to 500h-hb obtained by photoelectric conversion of light detected by a high-angle back detection unit 102-*hb*. Similarly, a block that processes the output signal is provided corresponding to each signal output by each photoelectric conversion unit.

1051*a* to 1051*h* denote a high-frequency pass filter. The outputs of the high-frequency pass filters 1051*a* to 1051*h* are accumulated in a signal synthesis unit 1053 for a plurality of rotations of the rotation stage, and an array stream signal 1055-1*f* is output, which is obtained by adding and synthesizing signals acquired at the same position on the sample W.

1052*a* to 1052*h* denote a low-frequency pass filter. Similar to 1053, a signal synthesis unit 1054 outputs an array stream signal 1056-1*f* obtained by adding and synthesizing signals acquired at the same position. 105-*hb* also performs operation similar to that of 105-1*f* and outputs an array stream signal 1055-*hb* synthesized from the outputs of the high-frequency pass filters 1051*a* to 1051*h* and an array stream signal 1056-*hb* synthesized from the outputs of the low-frequency pass filters.

A defect detection unit 1057 performs threshold processing after linearly adding a signal obtained by linearly adding a signal that is filtered by a high-frequency pass filter to a signal output by a plurality of photoelectric conversion units. A low-frequency signal integration unit 1058 integrates signals filtered by the low-frequency pass filters. An output of the low-frequency signal integration unit 1058 is input to the defect detection unit 1057 and used for determining the threshold value. Typically, the noise is estimated to increase in proportion to square root of the output of the low-frequency signal integration unit 1058.

Therefore, a threshold value in proportion to the square root of the signal of the low-frequency signal integration unit 1058 is given after the array stream signal of the defect detection unit 1057 is associated with the array stream signal of the low-frequency signal integration unit 1058, so as to extract the signal of the defect detection unit 1057 exceeding the threshold value as a defect. The signal of the defect detected by the defect detection unit 1057 is output to the control unit 53 together with signal intensity of the defect and detection coordinates on the sample W. The signal intensity detected by the low-frequency signal integration unit 1058 is also transmitted to the control unit 53 as roughness information of the surface of the sample, and is output to the display unit 54 or the like to a user who operates the apparatus.

Second Embodiment

Next, a defect inspection apparatus according to the second embodiment will be described. A configuration of the defect inspection apparatus according to the second embodiment is almost the same as that of the first embodiment shown in FIG. 1, and descriptions thereof will be omitted.

The detection unit 102 in the second embodiment will be described with reference to FIGS. 19A and 19B. Unlike the first embodiment, the spot 20 is imaged on the photoelectric conversion unit 103 by using the lens array 1028 and a cylindrical lens array 1029 in a direction orthogonal to the lens array 1028. The cylindrical lens array 1029 separates and forms an image on the photoelectric conversion unit 103 in a direction S11". Therefore, pixel blocks are two-dimensionally arranged in the photoelectric conversion unit 103. Eight pixel blocks of 1031-L to 1034-L and 1031-R to 1034-R are formed. A signal integration circuit 105-pre integrates the photoelectrically converted electrical signals output from the photoelectric conversion unit 103, and transmits the integrated signals to the signal processing unit 105. Specific processing of the signal integration circuit 105-pre will be described below.

Figure 20:
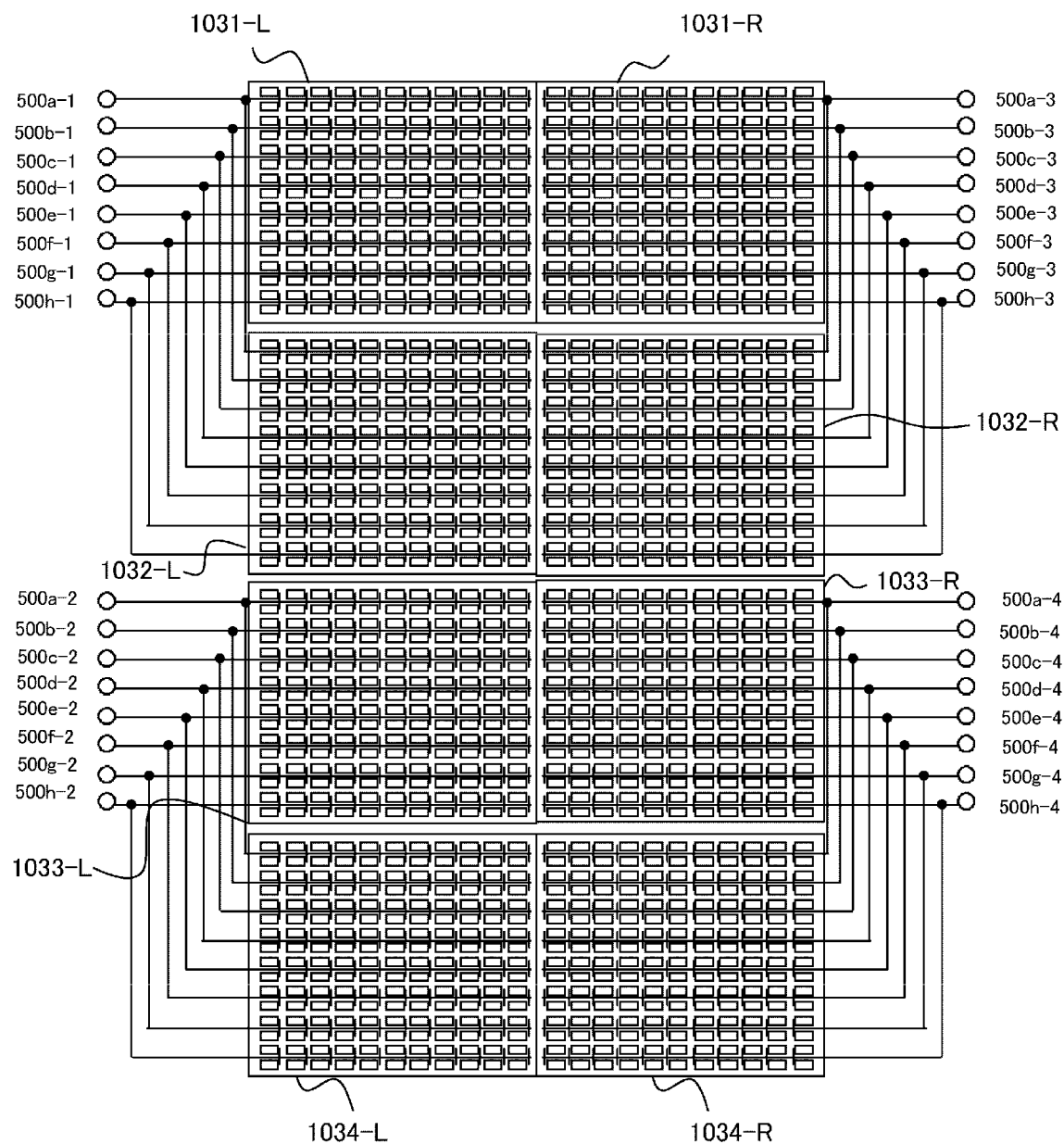
FIG. 20 is a diagram showing a second example of a photoelectric conversion unit.

FIG. 20 shows a detailed pattern of the photoelectric conversion unit 103 in the second embodiment. The eight pixel blocks 1031-L to 1034-L and 1031-R to 1034-R are divided into four pixel block groups. That is, "1031-L, 1032-L", "1033-L, 1034-L", "1031-R, 1032-R", and "1033-R, 1034-R". The pixel blocks belonging to the same pixel block group are electrically connected between pixel groups corresponding to each other, and pixel blocks are not connected between different pixel block groups.

In the second embodiment, the light spot 20 is divided into eight regions W-a to W-h, and the number of pixel block groups is four, so that a total of 32 outputs are obtained. That is, the pixel block group "1031-L, 1032-L" outputs currents corresponding to photons detected at 500*a*-1 to 500*h*-1 by electrically connecting outputs of the pixel groups forming images of the same divided region of the light spot 20. Similarly, "1033-L, 1034-L" outputs currents corresponding to photons detected at 500*a*-2 to 500*h*-2. "1031-R, 1032-R" outputs currents corresponding to photons detected at 500*a*-3 to 500*h*-3. "1033-R, 1034-R" outputs currents corresponding to photons detected at 500*a*-4 to 500*h*-4.

Figure 21:
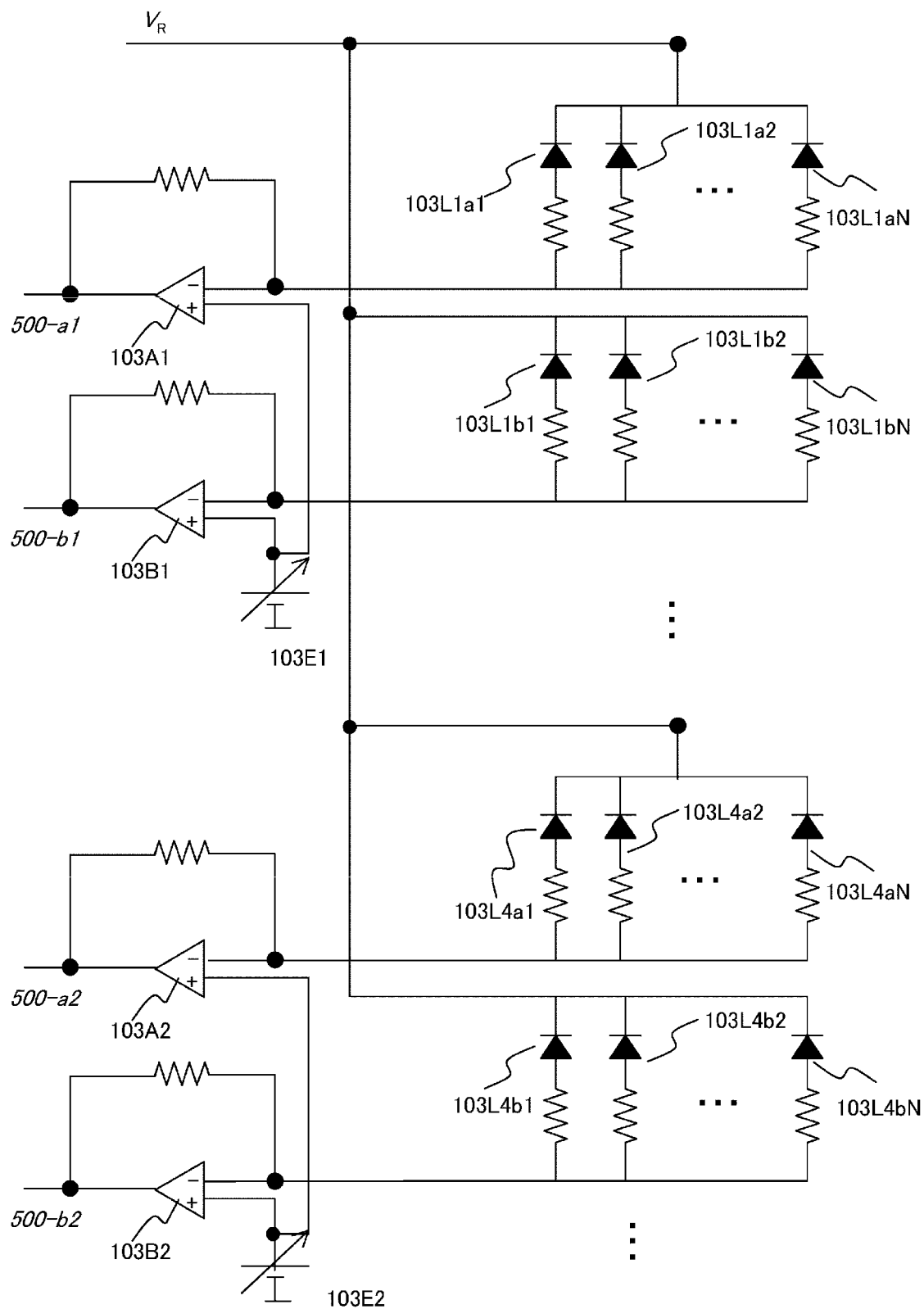
FIG. 21 is a diagram showing a second example of an equivalent circuit of components of the photoelectric conversion unit.

FIG. 21 is an equivalent circuit of a left half of the sensor described in FIG. 20, that is, 1031-L to 1034-L. Each of the 103L1*a*1 to 103L1*a*N corresponds to a pixel belonging to a pixel group a, which detects photons from the region W-a, in 1031-L, and is configured with an avalanche photodiode and a quenching resistor electrically connected thereto. 103L1*a*1 to 103L1*a*N are connected to a current-voltage converter 103A1 and output the number of photons, which are converted into a voltage, to 500*a*-1.

Similarly, 103L1*b*1 to 103L1*b*N are a set of avalanche photodiodes and quenching resistors corresponding to the pixels belonging to a pixel group b, which detects photons from the region W-b, in 1031-L. 103L1*b*1 to 103L1*b*N are connected to a current-voltage converter 103B1 and output the number of photons, which are converted into a voltage, to 500*b*-1.

A variable offset voltage regulator 103E1 is connected to the current-voltage converters 103A1 and 103B1. As a result, a reverse voltage applied to 103L1*a*1 to 103L1*a*1N and 103L1*b*1 to 103L1*b*N is a difference between VR and an offset voltage applied by 103E1. Since the quantity of currents output from the avalanche photodiode in Geiger mode corresponds to the reverse voltage applied to the avalanche photodiode, the voltage of 103E1 is adjusted to control the gain of 500*a*-1 or 500*a*-2 relative to the number of detected photons.

Similarly, each of 103L4*a*1 to 103L4*a*N corresponds to a pixel belonging to a pixel group a, which detects photons from the region W-a, in 1034-L, and is configured with an avalanche photodiode and a quenching resistor electrically connected thereto. 103L4*a*1 to 103L4*a*N are connected to a current-voltage converter 103A2 and output the number of photons, which are converted into a voltage, to 500*a*-2.

Similarly, 103L4*b*1 to 103L4*b*N are a set of avalanche photodiodes and quenching resistors corresponding to the pixels belonging to the pixel group b, which detects photons from the region W-b, in 1034-L. 103L4*b*1 to 103L4*b*N are connected to a current-voltage converter 103B2 and output the number of photons, which are converted into a voltage, to 500*b*-2. A variable offset voltage regulator 103E2 is connected to the current regulators 103A2 and 103B2, and controls the gain of the voltage output by 500*b*-2.

As described above, the gain of the voltages output from the pixel block groups is individually adjusted. Each pixel block group corresponds to a region of a pupil of the objective lens 1021 in FIG. 19B. The scattering distribution of defects to be inspected and a position of scattered light due to roughness of the surface of the sample in a far field are known. Typically, the scattered light due to surface of the sample roughness is strongly backscattered, when the defect is a particulate defect on an upper surface of the sample, the distribution is isotropic distribution in a low-angle direction, and the sample is mirror-polished silicon before a semiconductor pattern is formed. Now, the specific scattered light intensity of the target defect in the far field is set to s ($\theta$, $\varphi$), and the roughness scattering from the sample is set to n ($\theta$, $\varphi$). When a region of the far field corresponding to a specific pixel block group i is set to Q (i), the number of scattered photons detected by the pixel block group is represented by the following (Formula 11) and (Formula 12).

$$S(i) = \sum_{(\theta,\phi)\in\Omega(i)} s(\theta, \phi) \qquad \text{(Formula 11)}$$

$$N(i) = \sum_{(\theta,\phi)\in\Omega(i)} n(\theta, \phi) \qquad \text{(Formula 12)}$$

The gain to be applied to the pixel block group is typically shown as the following (Formula 13).

$$\text{gain}(i) \propto S(i)/(N(i)+EN(i)^2) \qquad \text{(Formula 13)}$$

Here, N(i) represented by (Formula 12) is a roughness noise from the surface of the sample, whereas EN(i) represented by (Formula 13) is a non-optical noise, typically an electrical noise. 103E1, 103E2 are adjusted to control the gain to be a gain represented by (Formula 13).

Figure 22:
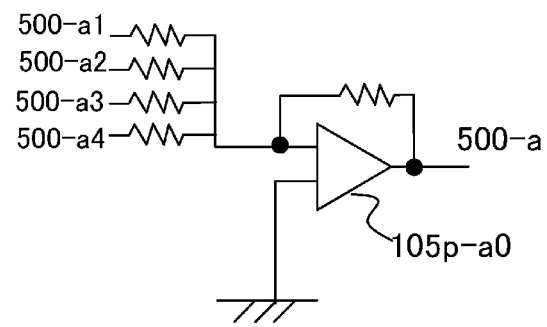
FIG. 22 is a diagram showing a first example of an equivalent circuit of an integrated part of output signals of the photoelectric conversion unit.
Figure 22:
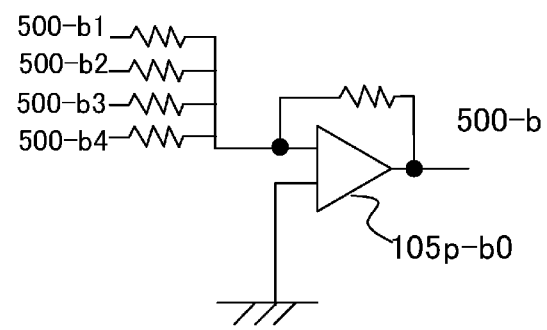
Figure 22:
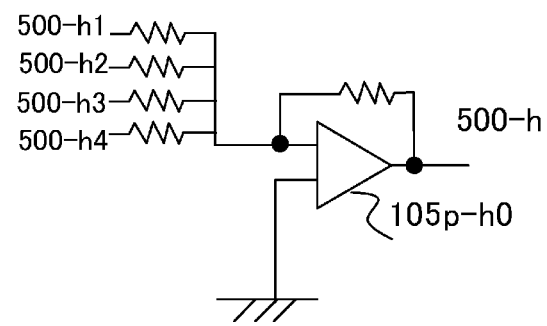

FIG. 22 shows integration in the signal integration circuit 105-pre. 500*a*-1 to 500*a*-4 denote outputs corresponding to W-a, which are outputs from individual pixel block groups. These outputs are added by an adder 105*p*-*a*0, and 500-*a* is output. Similarly, 500-*b*1 to 500-*b*N are outputs corresponding to W-b and are added by 105*p*-*b*0 to output 500-*b*. 500-*hi* to 500-hN correspond to W-h, and are added by 105*p*-*h*0 to output 500-*h*.

Figure 23:
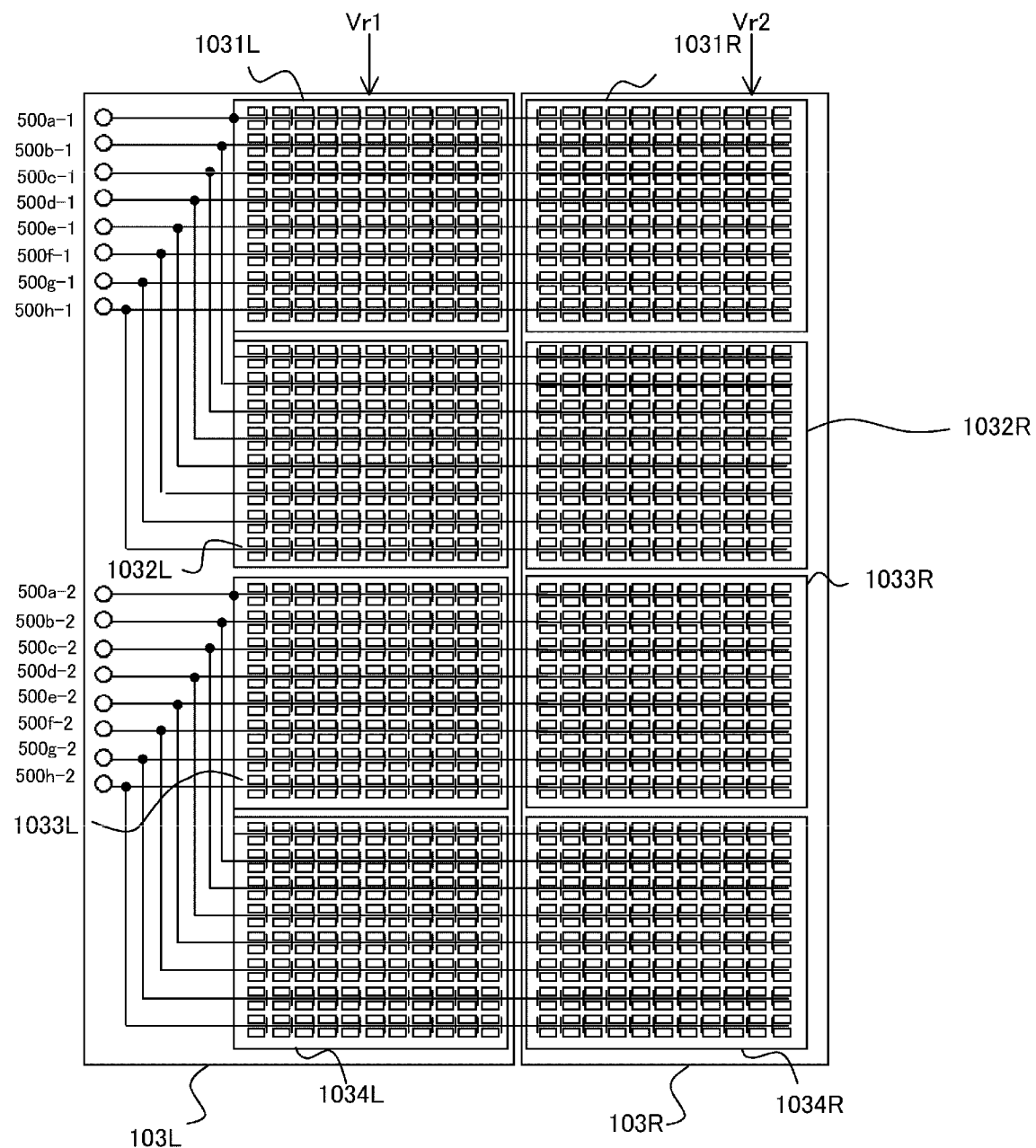
FIG. 23 is a diagram showing a third example of a photoelectric conversion unit.

FIG. 23 shows an embodiment different from that of FIG. 20. FIG. 20 shows one chip. However, FIG. 23 shows two chips 103L and 103R, and bias voltages Vr1, Vr2 are applied to the chips, respectively. The pixel blocks 1031L to 1034L formed in the chip 103L are connected to the pixel blocks 1031R to 1034R formed in the chip 103R, respectively. As a result, 500*a*-3 to 500*h*-3 and 500*a*-4 to 500*h*-4 required in the embodiment of FIG. 20 are unnecessary.

Figure 24:
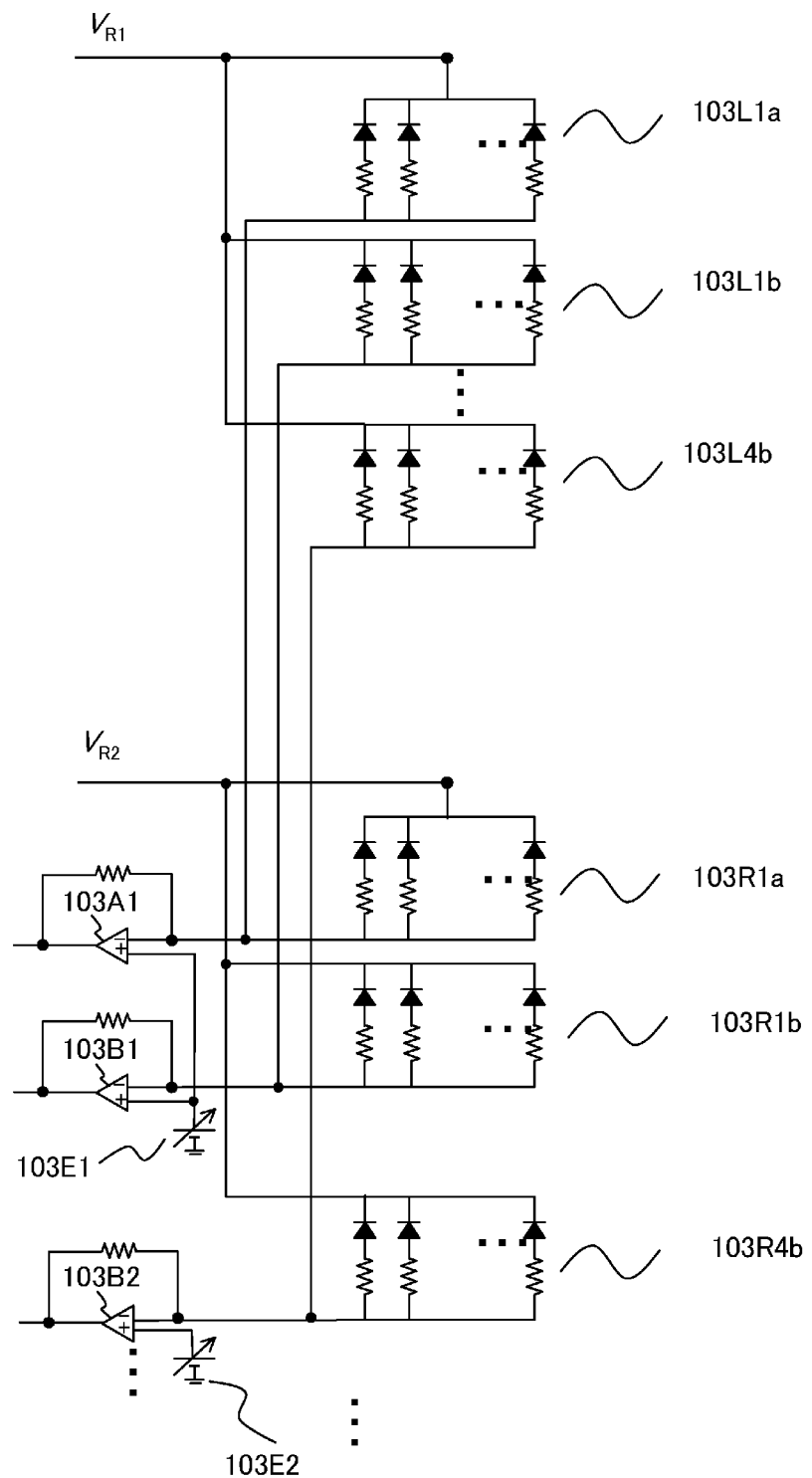
FIG. 24 is a diagram showing a third example of an equivalent circuit of components of the photoelectric conversion unit.

FIG. 24 is an equivalent circuit of the pattern of FIG. 23. 103L1*a* denotes a pixel group of a pixel block 103L1 formed in the chip 103L, which corresponds to W-a. 103L1*b* denotes a pixel group of the same pixel block, which corresponds to W-b. 103L4*b* denotes a pixel group of the pixel block 103L4 formed in the chip 103L, which corresponds to W-b. An inverse voltage VR1 is applied to these avalanche photodiodes formed in the chip 103L.

103R1*a* denotes a pixel group of the pixel block 103R1 formed in the chip of 103R, which corresponds to W-a. 103R1*b* denotes a pixel group of the same pixel block, which corresponds to W-b. 103R4*b* denotes a pixel group of the pixel block 103R4 formed in the chip 103R, which corresponds to W-b. An inverse voltage VR2 is applied to these avalanche photodiodes formed in the chip 103R. An output of 103L1*a* is electrically connected to an output of 103R1*a*, and the sum of currents flowing here is input to the current-voltage converter 103A1. Although not shown, currents, which are output by a pixel group 103L2*a*, corresponding to W-a, of the same pixel block group as 103L1, and a pixel group 103R2*a*, corresponding to W-a, of the same pixel block group as 103R1, are also input to 103A1 and are converted into a voltage.

Similarly, an output of a pixel group 103L1*b*, corresponding to W-b, of the pixel block 103L1 of the chip 103L is connected to an output of a pixel group 103R1*b*, corresponding to W-b, of the pixel block 103R1 of the chip 103R, and the outputs are input to 103B1.

Although not shown, currents, which are output by a pixel group 103L2*a*, corresponding to W-a, of the same pixel block group as 103R1, and a pixel group 103R2*a*, corresponding to W-a, of the same pixel block group as 103R1, are also input to 103A1 and are converted into a voltage.

An output of 103L4*b* is electrically connected to an output of 103R4*b*, and the outputs are connected to a current-voltage converter 103B2. Although not shown, similarly, 103L3*b* is also connected to 103R3*b*, and all of the currents in these pixel groups are converted into a voltage by 103B2. 103A1 and 103B1 are connected to the variable offset voltage regulator 103E1. 103E1 is connected to all the current-voltage converters connected to the pixel groups belonging to the pixel blocks 103L1, 103L2, 103R1, and 103R2.

Similarly, all the current-voltage converters connected to the pixel groups belonging to 103L3, 103L4, 103R3, and 103R4 are connected. When a voltage of 103E1 is defined as V1 and a voltage of 103E2 is defined as V2, a voltage of Vr1-V1 is applied to 103L1 and 103L2, a voltage of Vr1-V2 is applied to 103L3 and 103L4, a voltage of Vr2-V1 is applied to 103R1 and 103R2, and a voltage of Vr2-V2 is applied to 103R3 and 103R4. Therefore, Vr1, Vr2, V1, and V2 can be combined to apply any voltage to each image block group.

In the second embodiment, the gain of each pixel block group is controlled by the reverse voltages Vr1 and Vr2 applied to the avalanche photodiode and the offset voltages V1 and V2 of the current-voltage converter, so as to control the gain. However, the method of implementation is not limited to this example. For example, as another implementation method, an analog multiplier for gain control may be provided for an output of each pixel block group. Alternatively, it is also possible to apply a commonly known method in which digital input is performed by an AD converter without gain control, and gain control is performed by using a digital multiplier after digitization.

Third Embodiment

Next, a defect inspection apparatus according to the third embodiment will be described. Since a configuration of the defect inspection apparatus according to the third embodiment is almost the same as the configuration of the first embodiment shown in FIG. 1, descriptions thereof are omitted.

The detection unit 102 in the third embodiment will be described with reference to FIGS. 25A to 25C. A detection unit shown in FIG. 25A has a structure similar to that of the detection unit shown in FIG. 19B. However, the polarization control method of the polarization control filter 1022 and the diffuser 1027 are removed, and two lenses 1029, two lenses 1028, and two photoelectric conversion units 103 are provided on a downstream side of the polarization beam splitter 1026.

When the numerical aperture of the objective lens 1021 is increased to efficiently detect scattering from a miniaturized defect by an element that changes a state of incident polarization, the polarization direction in the far field to which the objective lens 1021 corresponds changes greatly within the aperture. In order to cope with this, the polarization control filter 1022 is configured with two wave plates: a segmented wave plate 1022-1 (see FIG. 25B) and a half-wave plate 1022-2 (see FIG. 25C). The segmented wave plate 1022-1 applies a 1800 phase difference to two orthogonal polarization components using a birefringent material, similar to the half-wave plate. A direction of a fast axis is set for each region as indicated in 1022-1 so as to maximize sensitivity of the assumed defect.

Since the photoelectric conversion units 103-1 and 103-2 are separately divided into four pixel block groups, distribution of the fast axis changes discontinuously in correspondence with a boundary of the pixel block groups typically. The segmented wave plate 1022-1 is generally manufactured by determining the distribution of the fast axis based on a sample to be inspected frequently and a defect type. However, in actual inspection, a composition of the surface of the sample or the defect is different from the assumption. In general, in the case of polarization control using a half-wave plate, the direction of the fast axis can be rotated by a drive mechanism such as a motor to control the polarization direction, so that the sensitivity is optimized for an actual inspection target. However, when 1022-1 is rotated, a position of the boundary of the pixel block groups deviates from the actual position, which makes it difficult to optimize.

Therefore, the half-wave plate 1022-2 is provided together with the segmented wave plate 1022-1. The half-wave plate is provided with a rotation drive mechanism for fine adjustment. 1022-1 and the half-wave plate 1022-2 may also be removed from the optical path. The lenses 1029-1 and 1029-2 have the same function as the lens array 1029 of FIGS. 19A and 19B. The cylindrical lens arrays 1028-1 and 1028-2 also have the same function as the lens array 1028 shown in FIGS. 19A and 19B. The photoelectric conversion units 103-1 and 103-2 also have the same function as the photoelectric conversion unit 103 in FIGS. 19A and 19B. The photoelectric conversion unit 103-2 can detect light absorbed by the diffuser 1027 of FIGS. 19A and 19B, and sensitivity of the defect that have not been focused mainly by the segmented wave plate 1022-1 and the half-wave plate 1022-2 may be improved.

Fourth Embodiment

Next, a defect inspection apparatus according to the fourth embodiment will be described.

Figure 26:
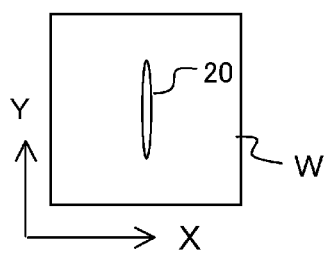
FIG. 26 is a diagram showing a second example of a scanning direction on the surface of the sample.

Since a basic configuration according to the fourth embodiment is almost the same as that of the defect inspection apparatus of the first embodiment shown in FIG. 1, the detailed descriptions thereof are omitted. However, the stage 104 is movable in two directions of XY. In the first to third embodiments, scanning is performed while the sample W is rotated in the θ direction by the stage 104. However, in the fourth embodiment, inspection is performed by scanning the sample W in the X direction as shown in FIG. 26.

Figure 27:
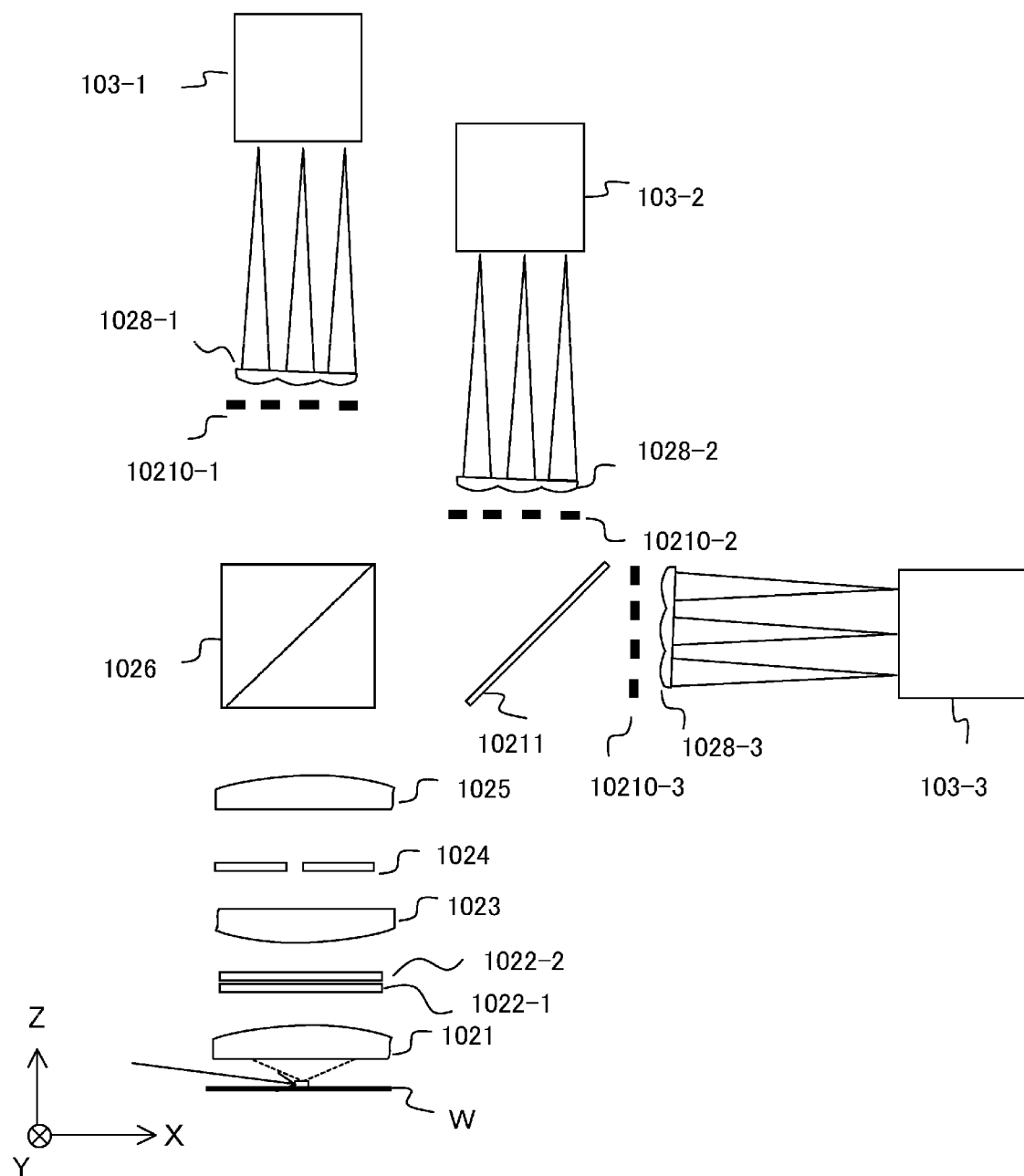
FIG. 27 is a diagram showing a third example of a configuration of a detection unit.

The detection unit 102 in the fourth embodiment will be described with reference to FIG. 27.

In the fourth embodiment, a defect is detected on the sample W on which a pattern is formed is detected. The detection unit 102 has a relatively small aperture in FIGS. 25A-25C. The detection unit 102 includes a plurality of detection systems in one apparatus as shown in FIG. 10, but the detection unit 102 includes one lens whose numerical aperture approaches 1 in FIG. 26. The objective lens 1021, the polarization control filters 1022-1 and 1022-2, the polarization control filter 1023, the aperture 1024, the condenser lens 1025, and the polarization beam splitter 1026 have the same functions as those with the same number shown in FIGS. 25A-25C.

The polarization beam splitter 1026 splits the optical path based on the polarization component. 10210-1 to 10210-3 denote a spatial filter which is typically configured with a plurality of rods that can be moved to a diffracted light position by a motor so as to shield diffracted light from a pattern. 10211 denotes a perforated mirror.

Figure 28:
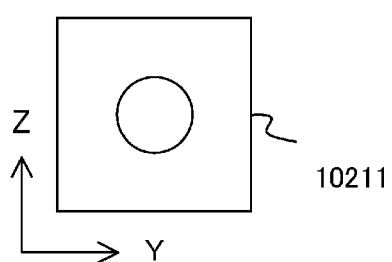
FIG. 28 is a diagram showing an optical path branching mirror as a configuration of the detection unit.

FIG. 28 is a Y-Z plan view of the perforated mirror 10211. The light having passed through the aperture is directed to the spatial filter 10210-3, and the other light is directed to the spatial filter 10210-2. 1028-1 to 1028-3 denote a cylindrical lens array and are arranged in a vicinity of a position where a pupil of the objective lens 1021 is optically relayed. The lens arrays 1028-1 to 1028-3 image a plurality of images of the beam spot 20 on the photoelectric conversion units 103-1 to 103-3, respectively.

Figure 29:
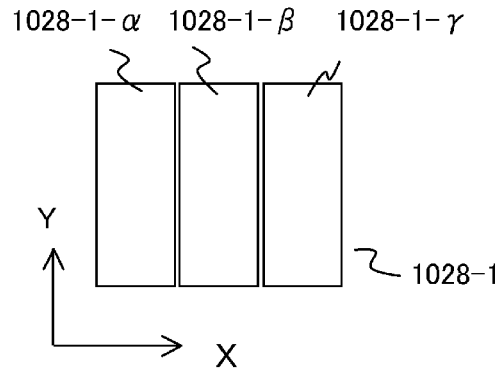
FIG. 29 is a diagram showing a configuration example of a lens array.
Figure 30:
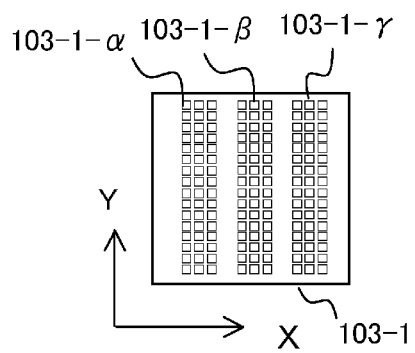
FIG. 30 is a diagram showing a configuration example of a multi-channel TDI sensor.

FIG. 29 shows the lens array 1028-1. The lens arrays 1028-1-α to 1028-1-γ image the images of the scattered light of the far field, corresponding to the arrangement, on photoelectric conversion units 103-1-α to 103-1-γ respectively, which are a TDI sensor on the photoelectric conversion unit 103-1 shown in FIG. 30. The TDI sensor moves and accumulates charges in synchronization with scanning for W, and outputs pixels divided in the Y direction. Similarly, the photoelectric conversion units 103-2 and 103-3 capture images and transfer the images to the signal processing unit 105 to detect a defect.

Fifth Embodiment

In the fifth embodiment, an imaging unit 102-A2 shown in FIG. 13B is adopted as another configuration of an imaging unit 102-A1 shown in FIG. 13A.

In the configuration of the imaging unit 102-A1 shown in FIG. 13A, a plurality of images are formed on the photoelectric conversion unit 103 by one lens array 1028. However, in the imaging unit 102-A2 according to the fifth embodiment shown in FIG. 13B, imaging is performed by using three lens arrays 1028*a*, 1028*b*, and 1028*c* and one cylindrical lens 1029*a*.

First, 1028*a* and 1028*b* denote lens arrays for magnification adjustment, and 1028*c* denotes a lens array for imaging. 1028*a* and 1028*b* denote a Kepler magnification adjustment mechanism. The Kepler magnification adjustment mechanism is used here, but other adjustment mechanisms such as a Galileo magnification adjustment mechanism may be used without being limited to this example.

In the configuration of the imaging unit 102-A1 without the lens array 1028*a* and the lens array 1028*b*, a magnification error occurs in each image formed by the lens array 1028.

The magnification error will be described with reference to FIGS. 32A and 32B.

An angle formed between a light beam incident on the objective lens 1021 and the optical axis is defined as θ1. An angle formed between the sample W and the optical axis is defined as θ2. Here, it is assumed that the light beam incident in θ1 passes through a center of one lens among the lenses constituting the lens array 1028 at a position where the pupil of 1021 is relayed. An angle formed between a light ray and the surface of the sample is represented by θ3, which is represented by the following (Formula 14).

$$\sin\theta 3 = \left(1 - \left(\left(-\cos\theta 1 \;\; -\sin\theta 1\right)\left(-\sin\theta 2 \;\; \cos\theta 2\right)^T\right)^2\right)^{0.5} \quad \text{(Formula 14)}$$

Images formed on positions 10421 to 10423 of a light receiving surface 103 have a size proportional to sin θ3(i) that is calculated from a direction θ1(i) of a principal light ray incident on a lens i of 1028 for forming an image.

Figure 34:
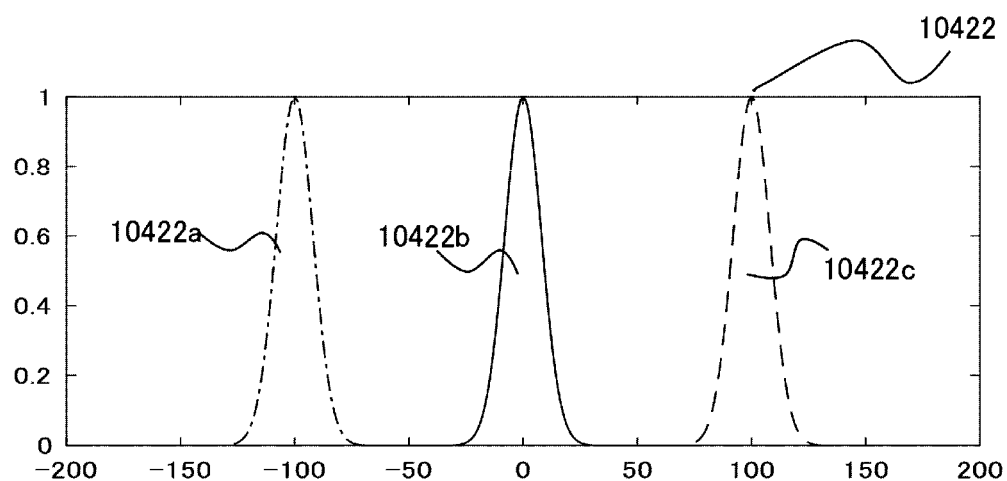
FIG. 34 is a graph showing an intensity profile of an image formed by the detection unit.
Figure 35:
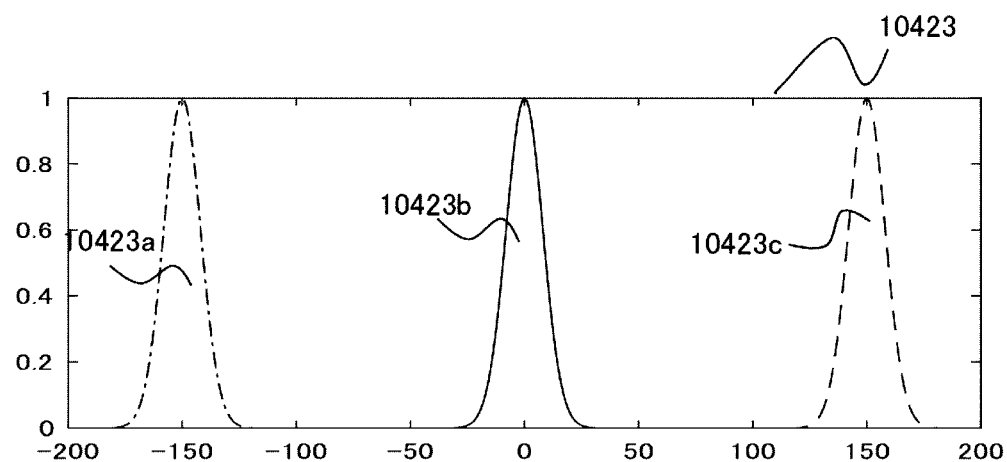
FIG. 35 is a graph showing an intensity profile of an image formed by the detection unit.

Here, FIGS. 33 to 35 show intensity profiles of images of a spherical body with a minute size in the sample W. FIGS. 33 to 35 show profiles of images formed on 10421, 10422, and 10423, respectively.

10421a to 10421c correspond to 1041a to 1041c, respectively. Similarly, 10422a to 10422c, and 10423a to 10423c are intensity profiles of images corresponding to 1041a to 1041c.

The intensity profiles shown in FIGS. 33 to 35 are formed by different lenses constituting the lens array 1028. Therefore, θ1(i) is different, so that sin θ3(i), which is a value proportional to the magnification, changes. When the numerical aperture of 102 increases, a change of θ1 becomes larger in the same lens. Accordingly, the change in magnification increases.

The thus-formed image is formed on the photoelectric conversion unit 103 shown in FIG. 16. For example, when pixels are connected to a signal line 1035-a, resolution of the image decreases when a pitch of the pixels formed in the pixel blocks 1031 to 1034 is constant. Therefore, pitches of pixels of the pixel blocks 1031 to 1034 are set in proportion to magnification corresponding to each pixel block. This can be realized by setting a pitch proportional to sin θ3(i) calculated by (Formula 14).

Sixth Embodiment

The sixth embodiment describes a method of preventing a decrease in resolution of an image due to a variation in magnification by adjusting a pitch of pixels constituting a pixel block corresponding to magnification of an image formed by a lens constituting the lens array 1028. However, when the pitch of pixels is changed, electrical capacity of the pixel changes, and frequency response output from the pixel changes for each signal line. Accordingly, a high-frequency component of a signal pulse tends to be lost over time.

Figure 36A:
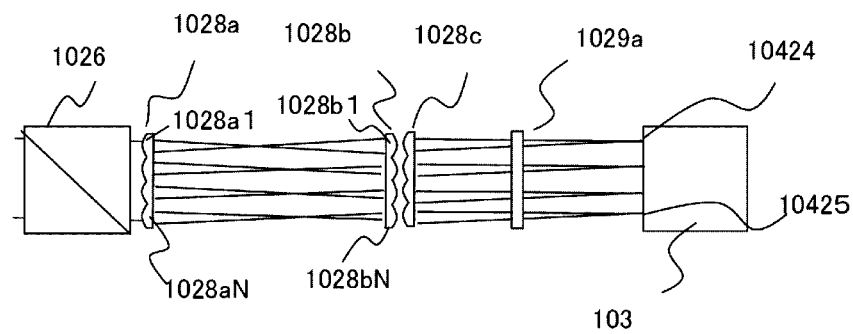
FIGS. 36A, 36B, and 36C are diagrams showing an example of a configuration of a detection unit.
Figure 36B:
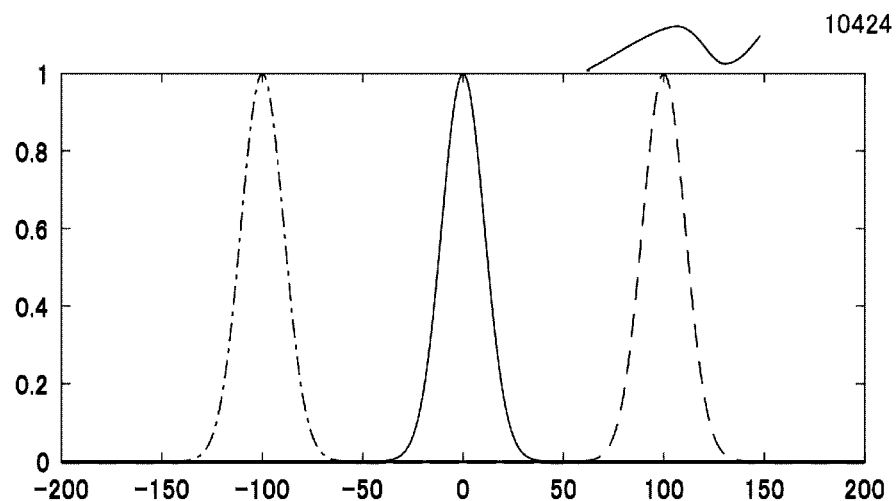
Figure 36C:
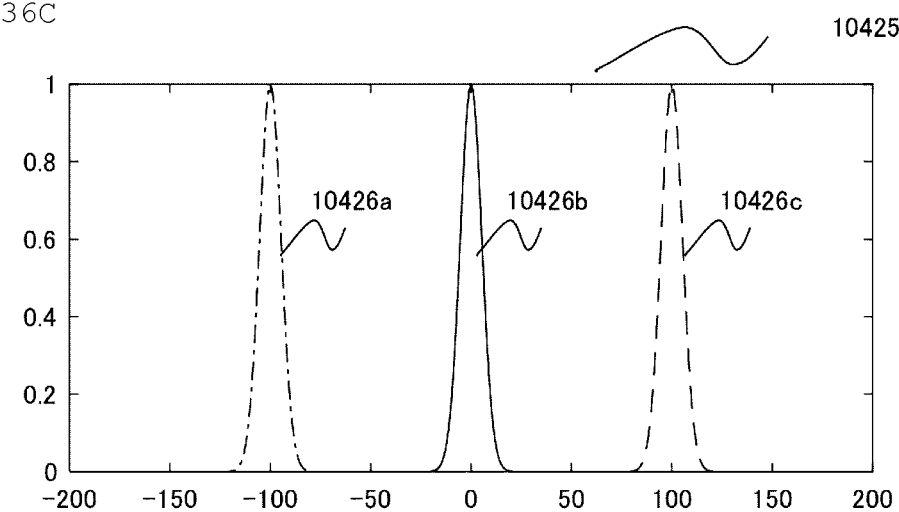

Therefore, in the sixth embodiment shown in FIGS. 36A-36C, the magnification is corrected by a Kepler magnification adjustment mechanism. As shown in FIG. 36A, the lens array 1028a is configured with cylindrical lenses 1028a1 to 1028aN. Similarly, the lens array 1028b is configured with cylindrical lenses 1028b1 to 1028bN. When focal lengths of cylindrical lenses of 1028a1 to 1028aN are set as fa(1) to fa(N) and focal lengths of cylindrical lenses of 1028b1 to 1028bN are set as fb(1) to fb(N), a focal length is set under the following conditions.

$$\forall i, fa(i)+fb(i)=C1 \quad \text{(Formula 15)}$$

$$\forall i, fa(i)\sin\theta 3(i)/fb(i)=C2 \quad \text{(Formula 16)}$$

$$\forall i, fb(i)<fa(i) \quad \text{(Formula 17)}$$

Here, C1 and C2 denote constants and design parameters. (Formula 15) is a necessary condition for all of the lenses constituting 1028a and 1028b to satisfy the conditions of the Kepler magnification adjustment.

(Formula 16) is a condition for correcting magnification that varies depending on an incidence direction toward a pupil and for making magnification of formed images same. (Formula 17) is a condition for preventing light beam from being larger than an aperture diameter of a lens in the lens array 1028b, and for preventing occurrence of a decrease in transmittance.

After the magnification is adjusted in this manner, intensity profiles of images of 1041a to 1041c imaged at 10424 are denoted by 10424a to 10424c (see FIG. 36B). In addition, similar profiles at 10425 are denoted by 10426a to 10426c (see FIG. 36C). The profile in 10424 becomes thick since the magnification is increased. However, distance between peaks matches the image formed by any lens.

Accordingly, a pitch of patterns in the photoelectric conversion unit, for example, a pixel pitch formed in pixel blocks denoted by 1031 to 1034 in FIG. 16 may be in a constant state. 1028c denotes an imaging lens, and focal lengths of the cylindrical lenses constituting the imaging lens 1028c are all the same.

A cylindrical lens 1029a is in a direction orthogonal to imaging directions of the cylindrical lenses 1028a to 1028c. The arrangement of the cylindrical lens 1029a will be described below in a seventh embodiment having the same structure.

Seventh Embodiment

Figure 19A:
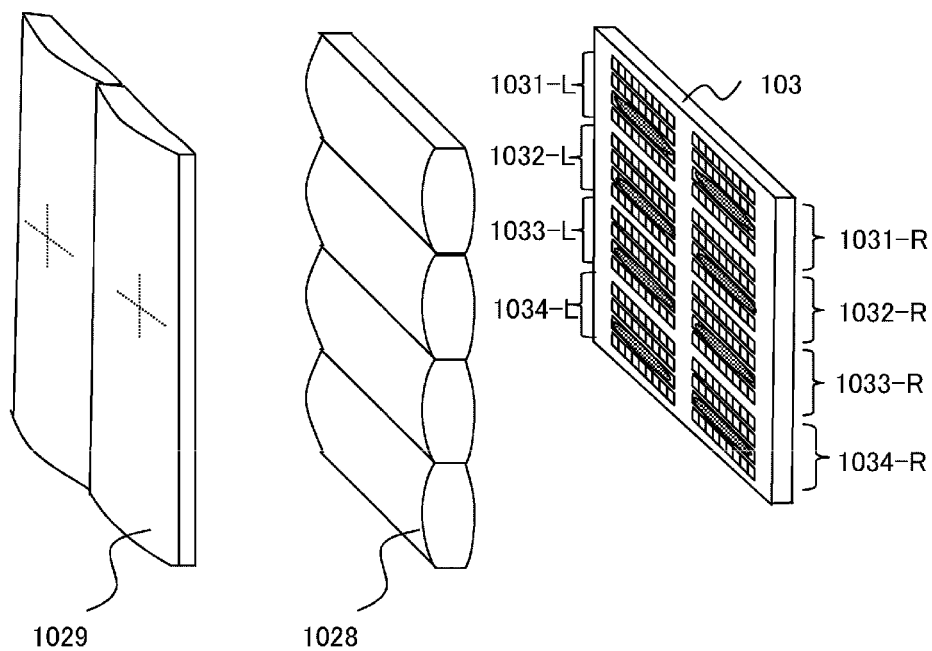
FIGS. 19A and 19B are diagrams showing a second example of a configuration of a detection unit.
Figure 19B:
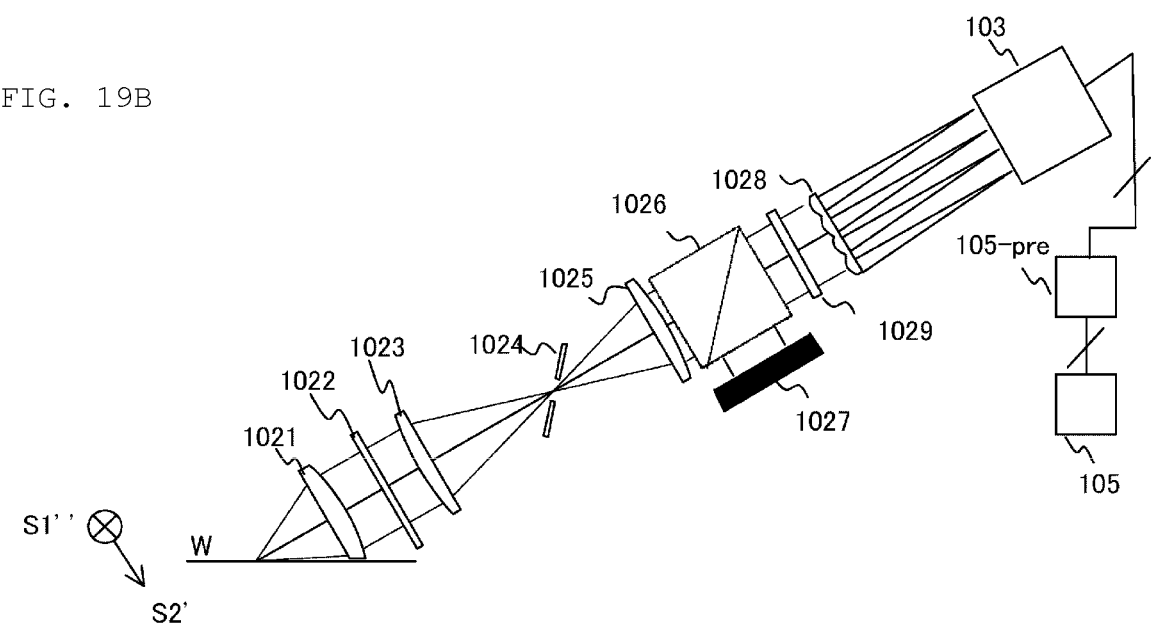
Figure 37:
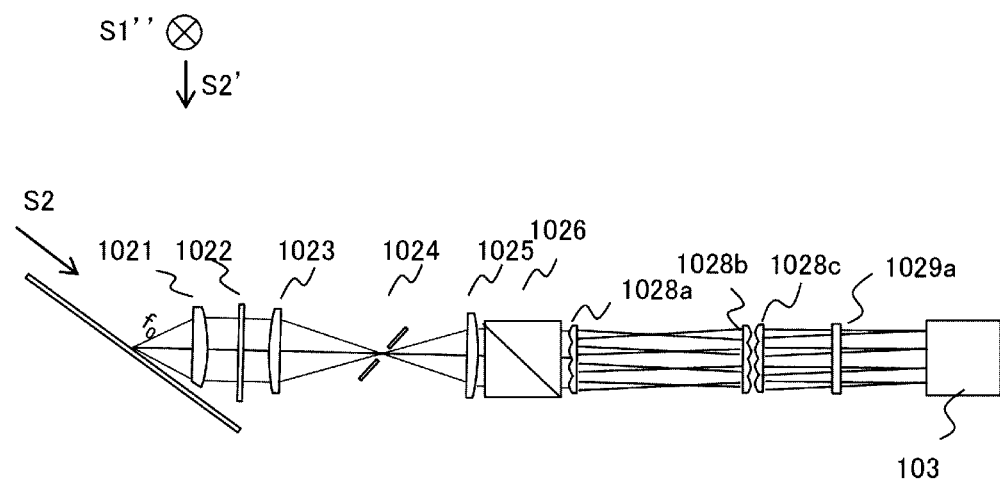
FIG. 37 is a diagram showing an example of a configuration of a detection unit.
Figure 38:
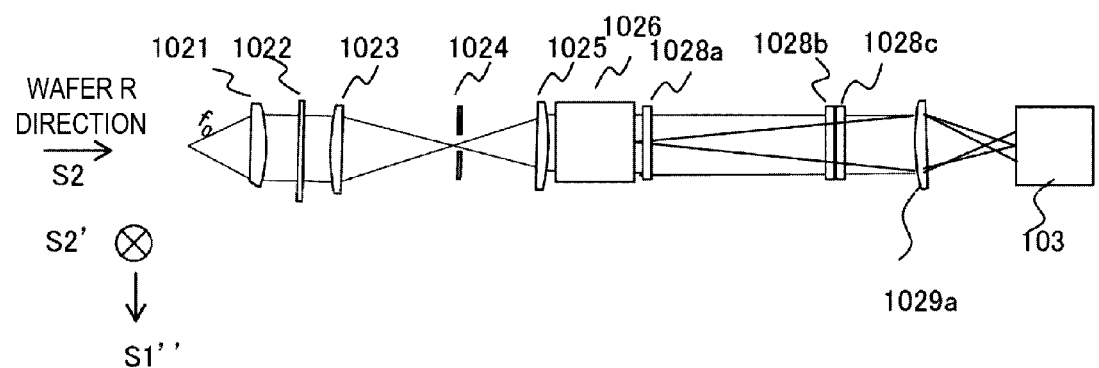
FIG. 38 is a diagram showing an example of a configuration of a detection unit.

FIGS. 37 and 38 show arrangement of an optical system, which is another embodiment of the detection unit 102B in FIGS. 19A and 19B, from different viewpoints.

In the configuration of the detection unit 102B in FIGS. 19A and 19B, 1029 denotes a cylindrical lens array, and is arranged at a position where the pupil of 1021 is relayed. However, since the cylindrical lens array 1028 is required to be arranged at the pupil, arrangement of optical components interferes. Accordingly, any of the lenses is required to be displaced from the pupil.

In the seventh embodiment, 1029a is used instead of 1029 to control light in a direction S1". 1029 is arranged at a pupil, and imaging is performed by each of two cylindrical lenses constituting 1029. In the seventh embodiment, when an image of light distribution in the direction S1", the light is not separated by lens arrays, and instead it is possible to form an image divided by a pupil equal to 1029. In a direction S2', similar to the sixth embodiment, light in a pupil is separated and forms an image by the lens arrays 1028a, 1028b, and 1028c arranged at positions where the pupil is relayed.

Eighth Embodiment

Figure 25A:
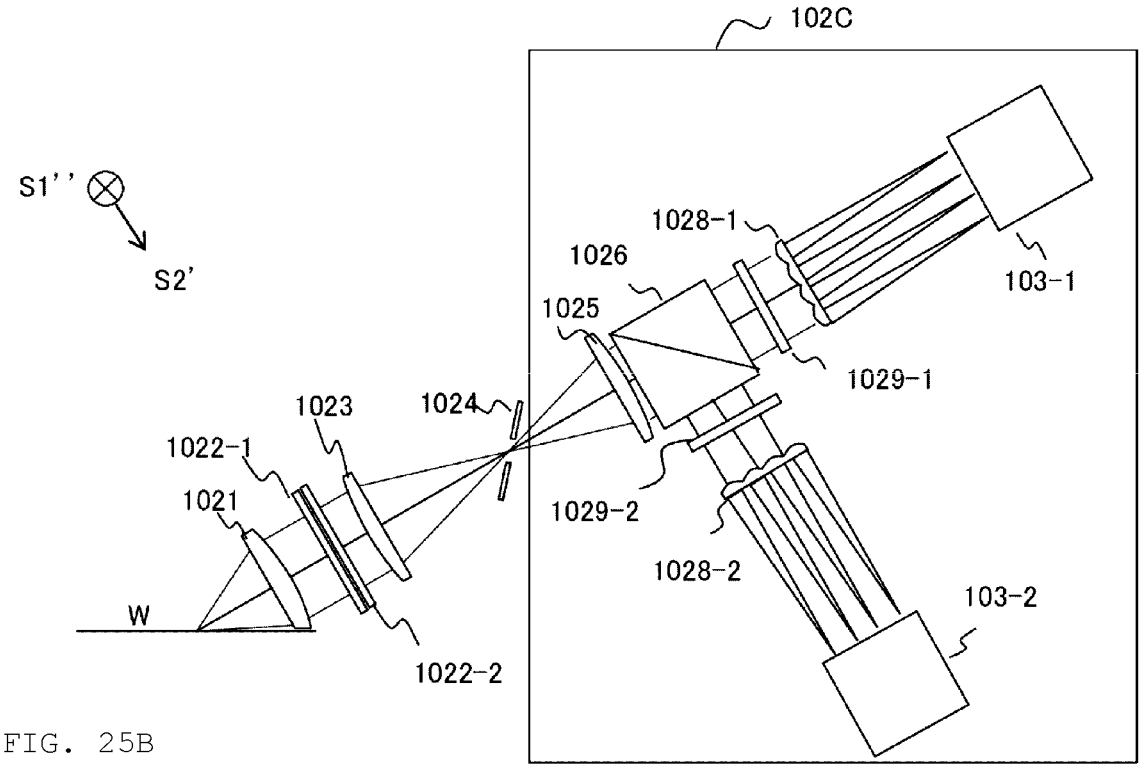
FIGS. 25A, 25B, and 25C are diagrams showing a second example of a configuration of a detection unit.
Figure 39:
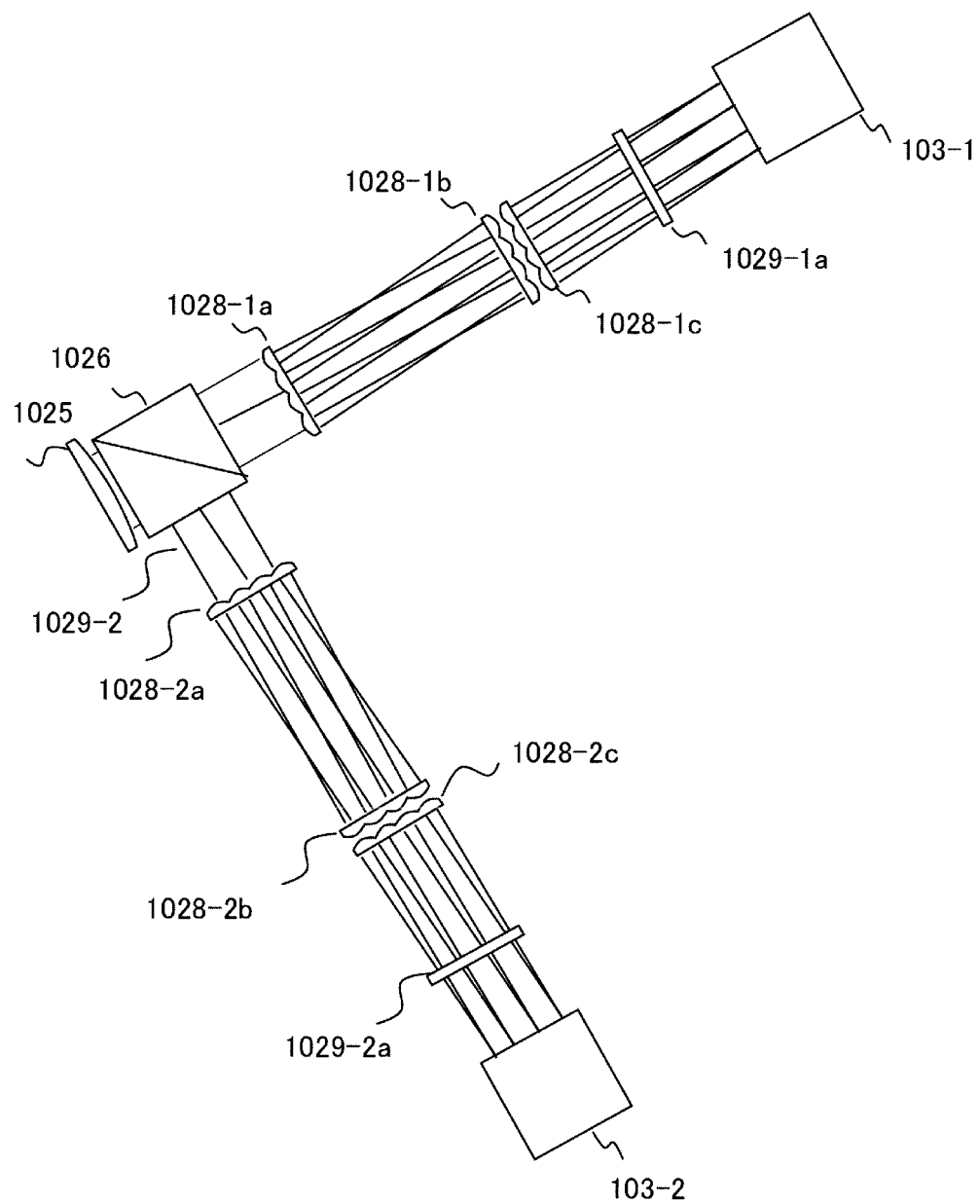
FIG. 39 is a diagram showing an example of a configuration of a detection unit.

Another configuration of the detection unit 102c of FIG. 25A is shown in FIG. 39.

1028-1a to 1028-1c and 1028-2a to 1028-2c have the same configuration and function as 1028a to 1028c in the sixth embodiment. 1029-1a and 1029-2a have the same configuration and function as 1029a in the seventh embodiment.

Figure 25B:
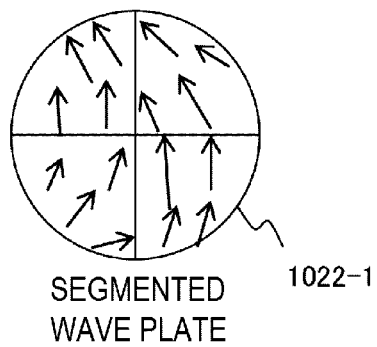
Figure 25C:
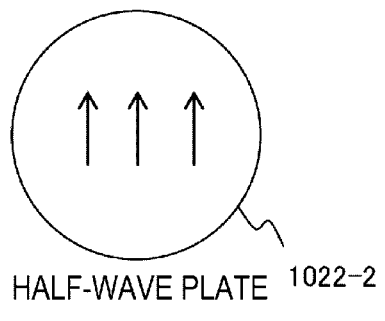

According to the configuration of the eighth embodiment, it is possible to prevent variation in magnification generated by the direction of the light beam incident on the objective lens 1021 in the configuration of FIGS. 25A-25C. In addition, interference of the optical component at a pupil position can also be prevented.

According to the above embodiments, the optical path is divided by an optical dividing unit arranged at a pupil position of a condensing unit or at or in a vicinity of a position where the pupil is relayed. Accordingly, an image having a numerical aperture that is relatively small relative to the numerical aperture of the first-stage condensing unit may be formed on the photoelectric conversion unit. As a result, the depth of the focus is increased, and thus imaging detection from a direction that is not orthogonal to the longitudinal direction of the illumination may be performed. That is, an imaging detection system can be arranged without being restricted by an azimuth angle, and images of the entire light scattered from an infinitesimal defect that exists on the surface of the sample can be substantially captured. In this way, the defect that exists on the surface of the sample can be detected with high accuracy by a defect inspection apparatus.

REFERENCE SIGNS LIST 2 light source
5 beam expander
6 polarization control unit
7 illumination intensity distribution control unit
24 illumination intensity distribution monitor
53 control unit
54 display unit
55 input unit
101 illumination unit
102 detection unit
103 photoelectric conversion unit
104 stage unit
105 signal processing unit
1021 objective lens
1022 polarization control filter
1023 polarization control filter
1024 aperture
1025 condenser lens
1026 polarization beam splitter
1027 diffuser
1028 lens array

The invention claimed is:

1. A defect inspection apparatus to detect defects that exist in a sample surface comprising:
an illumination unit configured to illuminate an inspection object region of the sample surface with light emitted from a light source;
a detection unit configured to detect scattered light generated from the inspection object region,
a photoelectric conversion unit configured to convert the scattered light detected by the detection unit into an electrical signal; and
a signal processing unit configured to process the electrical signal converted by the photoelectric conversion unit to detect a defect in the sample surface, wherein
the detection unit includes a first lens configured to converge the scattered light generated from the inspection object region;
an imaging unit configured to divide an aperture and form a plurality of images on the photoelectric conversion unit, the aperture being set to allow passing of only light in a region to be converted by the photoelectric conversion unit,
the signal processing unit is configured to synthesize electrical signals corresponding to the plurality of formed images to detect a defect in the sample surface, and the photoelectric conversion unit includes a plurality of pixel blocks corresponding to a plurality of arrays of a lens array
wherein the optical axis of the first lens is tilted from the normal of the sample surface.

2. The defect inspection apparatus according to claim 1, wherein the detection unit includes:
the first lens;
a second lens configured to form an image of the light converged by the first lens at a predetermined position;
a third lens configured to converge light from the image formed by the second lens; and
the lens array including a plurality of arrays and configured to divide an image converged by the third lens to divide the aperture by the plurality of lenses to form the plurality of images on the photoelectric conversion unit.

3. The defect inspection apparatus according to claim 2, wherein the detection unit further includes:
an aperture that is arranged at the predetermined position and shields a region, where photoelectric conversion is not performed by the photoelectric conversion unit, in the image formed by the second lens.

4. The defect inspection apparatus according to claim 1, wherein
the inspection object region is divided into a plurality of inspection regions,
the pixel block is configured with a plurality of pixel groups respectively corresponding to the plurality of inspection regions obtained by dividing the inspection object region,
each of the pixel groups includes a plurality of pixels arranged in a line shape, and
the photoelectric conversion unit electrically connects the plurality of pixels and synthesizes photoelectric conversion signals output by the plurality of pixels to output the electrical signals.

5. The defect inspection apparatus according to claim 2, wherein
the lens array is arranged at a position where a pupil of the first lens is relayed, and
the plurality of arrays divide the pupil of the first lens and forms the image on the photoelectric conversion unit for each of the pupil regions obtained by dividing the pupil.

6. The defect inspection apparatus according to claim 2, wherein
the lens array is arranged at a pupil position of the third lens.

7. The defect inspection apparatus according to claim 2, wherein
the lens array is arranged at a rear focal position of the third lens.

8. The defect inspection apparatus according to claim 4, further comprising:
a gain control unit configured to determine output intensity of the electrical signal corresponding to a quantity of light input to the pixels for each pixel group of the pixel block in the photoelectric conversion unit.

9. The defect inspection apparatus according to claim 8, wherein
the photoelectric conversion unit is configured with an avalanche photodiode formed for each of the pixels, and
the gain control unit controls an inverse voltage to be applied to the avalanche photodiode.

10. A defect inspection method to detect defects that exist in a sample surface, comprising:
- an illumination step of illuminating an inspection object region of the sample surface with light emitted from a light source;
- a light conversion step of converting scattered light generated from the inspection object region from the tilted direction of the normal of the sample surface;
- an imaging step of dividing an aperture and form a plurality of images on the photoelectric conversion unit, the aperture being set to allow passing of only light in a region to be converted by the photoelectric conversion unit,
- a photoelectric conversion step of converting the detected scattered light by a photoelectric conversion unit into an electrical signal;
- a defect detection step of processing the converted electrical signal to detect a defect of the sample surface, wherein
- an aperture of an imaging unit is divided to form a plurality of images on the photoelectric conversion unit in the light detection step, the aperture being set to allow passing of only light in a region to be converted by the photoelectric conversion unit, and
- electrical signals corresponding to the plurality of formed images are synthesized to detect a defect of the sample surface in the defect detection step.

11. The defect inspection method according to claim 10, wherein
- a plurality of pixel blocks are formed in the photoelectric conversion unit, and
- the plurality of images are formed on the plurality of pixel blocks of the photoelectric conversion unit respectively.

12. The defect inspection method according to claim 11, wherein
- the inspection object region is divided into a plurality of inspection regions,
- the pixel block is configured with a plurality of pixel groups respectively corresponding to the plurality of inspection regions obtained by dividing the inspection object region,
- the pixel group is configured with a plurality of pixels arranged in a line shape, and
- the photoelectric conversion unit electrically connects the plurality of pixels, and synthesizes photoelectric conversion signals output by the plurality of pixels to output the electrical signals.

13. The defect inspection method according to claim 12, further comprising:
- a step of determining output intensity of the electrical signals each corresponding to a quantity of light input to the pixel for each pixel group of the pixel block of the photoelectric conversion unit.

14. The defect inspection method according to claim 13, wherein
- the photoelectric conversion unit is configured with an avalanche photodiode formed for each of the pixels, and
- the output intensity of the electrical signal is determined by controlling a reverse voltage to be applied to the avalanche photodiode.

15. The defect inspection apparatus according to claim 1, wherein
- an imaging unit forms each of the plurality of images obtained by dividing the aperture at magnification determined for each image on the photoelectric conversion unit.

16. The defect inspection apparatus according to claim 1, wherein
- in the photoelectric conversion unit, a pitch of pixels formed in the photoelectric conversion unit is set according to magnification of an image formed on the photoelectric conversion unit.

17. The defect inspection apparatus according to claim 2, wherein
- the lens array forms an image of the inspection object region in one direction and an image of a position of a pupil of the first lens in another direction different from the one direction, at magnification determined for each image on the photoelectric conversion unit.

18. The defect inspection apparatus according to claim 2, wherein
- the lens array forms an image of the inspection object region in one direction and an image of a position of the first lens where a pupil thereof is relayed in another direction different from the one direction, at magnification determined for each image on the photoelectric conversion unit.

* * * * *